(12) United States Patent
Daimatsu et al.

(10) Patent No.: US 11,237,302 B2
(45) Date of Patent: Feb. 1, 2022

(54) OPTICAL FILM

(71) Applicant: SUMITOMO CHEMICAL COMPANY, LIMITED, Tokyo (JP)

(72) Inventors: Kazuki Daimatsu, Osaka (JP); Hitoshi Fukui, Osaka (JP); Masayoshi Karasawa, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/573,297

(22) Filed: Sep. 17, 2019

(65) Prior Publication Data

US 2020/0103562 A1    Apr. 2, 2020

(30) Foreign Application Priority Data

Sep. 28, 2018 (JP) .............................. JP2018-184776
May 16, 2019 (JP) .............................. JP2019-093088

(51) Int. Cl.
*G02B 1/14* (2015.01)
*G06F 3/044* (2006.01)
(Continued)

(52) U.S. Cl.
CPC ........... *G02B 1/14* (2015.01); *C08G 73/1067* (2013.01); *C08G 73/14* (2013.01); *C09D 133/14* (2013.01);
(Continued)

(58) Field of Classification Search
CPC ......... G06F 2203/04102; G06F 3/0443; G06F 2203/04111; C08G 73/1067; C08G 73/14;
(Continued)

(56) References Cited

U.S. PATENT DOCUMENTS

2016/0215132 A1\* 7/2016 Zheng ...................... G02B 1/04
2017/0152358 A1\* 6/2017 Koh ...................... B32B 27/281
(Continued)

FOREIGN PATENT DOCUMENTS

JP    H09-48866 A    2/1997
JP    2009-215412 A    9/2009
(Continued)

OTHER PUBLICATIONS

Chinese Office Action (including an English translation thereof) issued in the corresponding Chinese Patent Application No. 201910912905.9 dated Apr. 7, 2021.
(Continued)

*Primary Examiner* — Muhammad N Edun
(74) *Attorney, Agent, or Firm* — Birch, Stewart, Kolasch & Birch, LLP

(57) ABSTRACT

To provide an optical film having excellent visibility in a wide angle direction. An optical film including a polyimide-based resin and a polyamide-based resin and having a total light transmittance of 85% or more and a haze of 0.5% or less, in which,
when a direction parallel to a machine direction in a plane of the optical film during production of the optical film is defined as an MD direction and a direction vertical to the machine direction is defined as a TD direction,
for at least any one surface of the optical film, a first reflection image clarity value $C_{MD}$ in a direction inclined 60° in the MD direction from a vertical direction to the plane of the optical film and a second reflection image clarity value $C_{TD}$ in a direction inclined 60° in the TD direction from the vertical direction which are obtained when a slit width of an optical comb is 0.125 mm in accordance with JIS K 7374 satisfy (Continued)

Formula (1)

$$45\% \leq C_{MD} \leq 100\% \quad (1),$$

Formula (2)

$$30\% \leq C_{TD} \leq 100\% \quad (2), \text{ and}$$

Formula (3)

$$35\% \leq (C_{MD}+C_{TD})/2 \leq 100\% \quad (3).$$

11 Claims, 1 Drawing Sheet

(51) Int. Cl.
 *C08G 73/10* (2006.01)
 *C09D 133/14* (2006.01)
 *C08G 73/14* (2006.01)
(52) U.S. Cl.
 CPC .. *G06F 3/0443* (2019.05); *G06F 2203/04102* (2013.01); *G06F 2203/04111* (2013.01)
(58) Field of Classification Search
 CPC .... C08G 73/1039; G02B 1/14; C09D 133/14; C08L 79/08; C08L 2203/16; C08L 2205/025
 See application file for complete search history.

(56) References Cited

U.S. PATENT DOCUMENTS

| | | | |
|---|---|---|---|
| 2017/0309867 A1* | 10/2017 | Mun | H01L 51/5246 |
| 2017/0329062 A1* | 11/2017 | Nakajima | C08G 73/14 |
| 2018/0257335 A1* | 9/2018 | Matsuo | B32B 27/283 |
| 2018/0348411 A1* | 12/2018 | Yamaki | G03B 21/14 |
| 2018/0370207 A1 | 12/2018 | Nodono et al. | |
| 2019/0153158 A1 | 5/2019 | Kondo et al. | |
| 2019/0224942 A1* | 7/2019 | Matsuo | B32B 27/20 |
| 2020/0064540 A1* | 2/2020 | Nichol | G02B 6/006 |

FOREIGN PATENT DOCUMENTS

| | | |
|---|---|---|
| JP | 2010-139379 A | 6/2010 |
| JP | 2018-123319 A | 8/2018 |
| JP | 2018-203986 A | 12/2018 |
| WO | WO 2017/014287 A1 | 1/2017 |
| WO | WO 2017/175869 A1 | 10/2017 |

OTHER PUBLICATIONS

Japanese Office Action (including an English translation thereof) issued in the corresponding Japanese Patent Application No. 2019-121676 dated Nov. 18, 2019.

Korean Office Action (including an English translation thereof) issued in the corresponding Korean Patent Application No. 10-2019-0978114 dated Sep. 17, 2019.

* cited by examiner

OPTICAL FILM

BACKGROUND OF THE INVENTION

Field of the Invention

The present invention relates to an optical film including at least one resin selected from the group consisting of a polyimide-based resin and a polyamide-based resin, and a flexible display device including the optical film.

Description of the Related Art

Conventionally, glass has been used as a material of display members such as a solar cell or an image display device. However, the glass was not sufficient to meet the recent demands for miniaturization, thinness, weight reduction, and flexibility of the display members. Therefore, as an alternative material of glass, various films are being considered. Examples of such a film include a polyimide film (for example, JP-A-2009-215412).

SUMMARY OF THE INVENTION

When the polyimide film is applied to transparent members such as a front plate of a flexible display device, an image may be displayed with an image display surface being bent, and thus, excellent visibility in a wide angle direction is required as compared with a non-flexible image display surface. However, according to the study of the present inventor, the conventional polyimide-based resin film may not be able to sufficiently satisfy the visibility in the wide angle direction.

Therefore, an object of the present invention is to provide an optical film having excellent visibility in a wide angle direction, and a flexible display device including the optical film.

As a result of intensive study for solving the above problems, the present inventors have found that the above problems can be solved by adjusting reflection image clarity values $C_{MD}$ and $C_{TD}$ and an average value $\{(C_{MD}+C_{TD})/2\}$ thereof, respectively, to be in a predetermined range in an optical film which includes at least one resin selected from the group consisting of a polyimide-based resin and a polyamide-based resin and has a total light transmittance of 85% or more and a haze of 0.5% or less, and have completed the present invention. That is, the present invention includes the following aspects.

[1] An optical film including at least one resin selected from the group consisting of a polyimide-based resin and a polyamide-based resin and having a total light transmittance of 85% or more and a haze of 0.5% or less, in which when a direction parallel to a machine direction in a plane of the optical film during production of the optical film is defined as an MD direction and a direction vertical to the machine direction is defined as a TD direction, for at least any one surface of the optical film, a first reflection image clarity value $C_{MD}$ in a direction inclined 60° in the MD direction from a vertical direction to the plane of the optical film and a second reflection image clarity value $C_{TD}$ in a direction inclined 60° in the TD direction from the vertical direction which are obtained when a slit width of an optical comb is 0.125 mm in accordance with JIS K 7374 satisfy Formula (1):

$$45\% \leq C_{MD} \leq 100\% \qquad (1),$$

Formula (2):

$$30\% \leq C_{TD} \leq 100\% \qquad (2), \text{ and}$$

Formula (3):

$$35\% \leq (C_{MD}+C_{TD})/2 \leq 100\% \qquad (3).$$

[2] The optical film according to [1], wherein a ΔHaze, a difference in the hazes before and after a bending test in accordance with JIS K 5600-5-1, is less than. 3%.

[3] The optical film according to [1] or [2], wherein each of a $\Delta C_{MD}$, a difference in the first reflection image clarity values before and after a bending test, and a $\Delta C_{TD}$, a difference in the second reflection image clarity values before and after the bending test in accordance with JIS K 5600-5-1, is less than 15.

[4] The optical film according to any one of [1] to [3], wherein the optical film has a thickness of 10 to 150 μm.

[5] The optical film according to any one of [1] to [4], further comprising a filler, wherein a content of the filler by mass relative to the optical film is 5% or less.

[6] The optical film according to any one of [1] to [5], wherein a tensile modulus at 80° C. is 4,000 to 9,000 MPa.

[7] The optical film according to any one of [1] to [6], wherein the optical film has a hard coat layer on at least one surface thereof.

[8] The optical film according to [7], wherein the hard coat layer has a thickness of 3 to 30 μm.

[9] A flexible display device comprising the optical film according to any one of [1] to [8].

[10] The flexible display device according to [9], further comprising a touch sensor.

[11] The flexible display device according to [9] or [10], further comprising a polarizing plate.

According to the present invention, it is possible to provide an optical film having excellent visibility in a wide angle direction, and a flexible display device including the optical film.

DETAILED DESCRIPTION OF THE PREFERRED EMBODIMENTS

Embodiments of the present invention will be described below. The scope of the present invention is not limited to the embodiments described herein, and various modifications can be made without departing from the spirit of the present invention. In addition, when a plurality of upper limits and lower limits are described for specific parameters, optional upper limits and lower limits among these upper limits and lower limits are combined to form a suitable numerical range.

<Optical Film>

An optical film according to the present invention is an optical film which includes at least one resin selected from the group consisting of a polyimide-based resin and a polyamide-based resin and has a total light transmittance of 85% or more and a haze of 0.5% or less, in which when a direction parallel to a machine direction in a plane of the optical film during production of the optical film is defined as an MD direction and a direction vertical to the machine direction is defined as a TD direction, for at least any one surface of the optical film, a first reflection image clarity value $C_{MD}$ in a direction inclined 60° in the MD direction from a vertical direction to the plane of the optical film and a second reflection image clarity value $C_{TD}$ in a direction inclined 60° in the TD direction from the vertical direction which are obtained when a slit width of an optical comb is 0.125 mm in accordance with JIS K 7374 satisfy Formula (1):

$$45\% \leq C_{MD} \leq 100\% \quad (1),$$

Formula (2):

$$30\% \leq C_{TD} \leq 100\% \quad (2), \text{ and}$$

Formula (3):

$$35\% \leq (C_{MD}+C_{TD})/2 \leq 100\% \quad (3).$$

[1. Formulae (1) to (3)]
(MD Direction and TD Direction)

An MD direction is a direction parallel to a machine direction in a plane of the optical film during production of the optical film, and indicates, for example, a direction parallel to a direction in which the optical film is conveyed when produced by a solution casting method. A TD direction is a direction vertical to the machine direction, and indicates, for example, a direction vertical to the conveyed direction. When the MD direction and the TD direction are unknown, the MD direction and the TD direction in the plane of the optical film are determined by the following method. With regard to the MD and the TD, at least 20 cross sections are made in different directions of the optical film. More specifically, assuming a circle having an arbitrary one point of the optical film as a central point, the optical film is cut in a straight shape so that a central angle of a fan shape obtained by cutting a semicircle from the optical film and further cutting the semicircle becomes substantially uniform, and as a result, 20 or more cross sections are made. A center of a thickness of the plurality of cross sections obtained is measured by laser Raman, and one having the largest peak intensity near 1,620 cm$^{-1}$ is defined as the MD direction.

(First Reflection Image Clarity Value $C_{MD}$)

Figure 1:
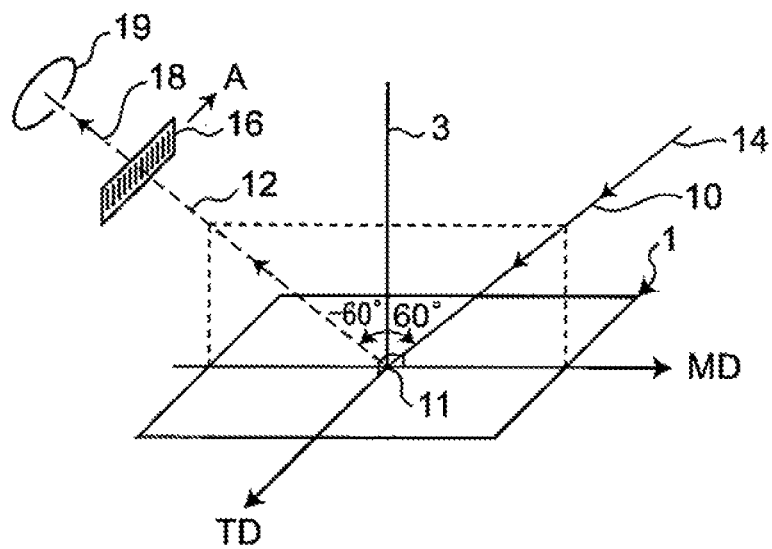
FIG. 1 is a diagram showing an optical axis on which a first reflection image clarity value is measured.

A first reflection image clarity value $C_{MD}$ is a reflection image clarity value in a direction inclined 60° in an MD direction from a vertical direction to a plane of an optical film, which is obtained in accordance with Japanese Industrial Standard (JIS) K 7374. The first reflection image clarity value $C_{MD}$ will be described more specifically with reference to FIG. 1. FIG. 1 is a diagram showing an optical axis on which the first reflection image clarity value is measured. A first irradiation light 10 (white light: indicated by a solid line in FIG. 1) is irradiated to an optical film 1 along an axis (first optical axis 14) inclined 60° in the MD direction from an axis (vertical axis 3) vertical to the optical film 1, with an arbitrary point (first irradiation position 11) on a surface of the optical film 1 as a fulcrum. Next, a first regular reflection light 12 (indicated by a broken line in FIG. 1) is transmitted to a first optical comb 16 extending vertically to a first direction inclined −60° in the MD direction from the vertical axis 3, with the first irradiation position 11 as the fulcrum. Next, a first transmitted light 18 (indicated by an alternate long and short dash line in FIG. 1) transmitted through the first optical comb 16 is received by a first light receiver 19 extending in the first direction. The first optical comb 16 has an opening which transmits the first regular reflection light 12 and a light shielding unit which shields the first regular reflection light 12. A slit width (width of the opening) of the first optical comb 16 is 0.125 mm.

The first light receiver 19 repeatedly receives the 1b-th transmitted light 18 by moving the first optical comb 16 in a predetermined unit width in a direction (direction of arrow A) which is parallel to a plane of the first optical comb 16 and in which slits are arranged in the first optical comb 16, thereby obtaining a received light waveform. A maximum value M and a minimum value m of a relative light amount are obtained from the light reception waveform obtained. The first reflection image clarity value $C_{MD}$ is calculated based on Formula (5) from M and m obtained.

[Math. 1]

$$\text{Reflection image clarity value (reflection image sharpness) [\%]} = \frac{M-m}{M+m} \times 100 \quad (5)$$

The reflection image clarity value (a first reflection image clarity value, and a second reflection image clarity value to be described below) can be measured using an image clarity measuring device.

When the first reflection image clarity value $C_{MD}$ satisfies Formula (1), the optical film has excellent visibility in a wide angle direction in the MD direction. The first reflection image clarity value $C_{MD}$ is 45% or more in Formula (1), and preferably 47% or more, more preferably 48% or more, still more preferably 50% or more and 100% or less from the viewpoint of further improving the visibility of the optical film in the wide angle direction in the MD direction.

(Second Reflection Image Clarity Value $C_{TD}$)

Figure 2:
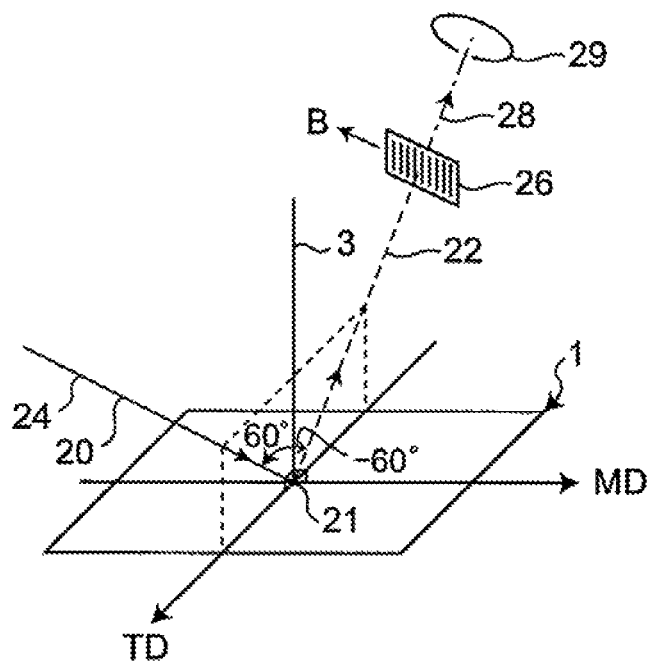
FIG. 2 is a diagram showing an optical axis on which a second reflection image clarity value is measured.

A second reflection image clarity value $C_{TD}$ is a reflection image clarity value in a direction inclined 60° in a TD direction from a vertical direction to a plane of an optical film, which is obtained in accordance with JIS K 7374. The second reflection image clarity value $C_{TD}$ will be described more specifically with reference to FIG. 2. FIG. 2 is a diagram showing an optical axis on which the second reflection image clarity value is measured. A second irradiation light 20 (white light: indicated by a solid line in FIG. 2) is irradiated to an optical film 1 along an axis (second optical axis 24) inclined 60° in the TD direction from an axis (vertical axis 3) vertical to the optical film 1, with an arbitrary point (second irradiation position 21) on a surface of the optical film 1 as a fulcrum. Next, a second regular reflection light 22 (indicated by a broken line in FIG. 2) is transmitted to a second optical comb 26 extending vertically to a second direction inclined −60° in the TD direction from the vertical axis 3, with the second irradiation position 21 as the fulcrum. Next, a second transmitted light 28 (indicated by an alternate long and short dash line in FIG. 2) transmitted through the second optical comb 26 is received by a second light receiver 29 extending in the second direction. The second optical comb 26 has an opening which transmits the second regular reflection light 22 and a light shielding unit which shields the second regular reflection light 22. A slit width (width of the opening) of the second optical comb 26 is 0.125 mm.

The second transmitted light 28 repeatedly receives light by moving the second optical comb 26 in a predetermined unit width in a direction (direction of arrow B) which is parallel to a plane of the second optical comb 26 and in which slits are arranged in the second optical comb 26, thereby obtaining a received light waveform. A maximum value M and a minimum value m of a relative light amount are obtained from the light reception waveform obtained. The second reflection image clarity value $C_{TD}$ is calculated based on Formula (5) from the M and m obtained.

When the second reflection image clarity value $C_{TD}$ satisfies Formula (2), the optical film has excellent visibility in a wide angle direction in the TD direction. The second reflection image clarity value $C_{TD}$ is 30% or more in Formula (2), and preferably 35% or more, more preferably 38% or more, particularly preferably 40% or more, and highly particularly preferably 45% or more and 100% or less from the viewpoint of further improving the visibility of the optical film in the wide angle direction in the TD direction.

When an average value $\{(C_{MD}+C_{TD})/2\}$ of the first reflection image clarity value $C_{MD}$ and the second reflection image clarity value $C_{TD}$ satisfies Formula (3), a difference in visibilities of the optical film in the wide angle directions in the MD direction and the TD direction is reduced. The $(C_{MD}+C_{TD})/2$ is 35% or more, and preferably 38% or more, more preferably 40% or more, still more preferably 44% or more, and particularly preferably 45% or more and 100% or less from the viewpoint of further reducing the difference in visibilities of the optical film in the wide angle directions in the MD direction and the TD direction.

The reflection image clarity values (more specifically, the first reflection image clarity value $C_{MD}$ and the second reflection image clarity value $C_{TD}$) can be defined to improve smoothness of the surface of the optical film to suppress scattering and the like on the surface of the optical film, thereby adjusting the smoothness. Furthermore, the smoothness of the surface of the optical film can be adjusted, for example, by compositions (more specifically, a type of filler, a particle size, and a content, and the like) of the optical film, and production conditions (more specifically, drying temperature, drying time, an air flow in a drying system, a thickness of a coating film, a conveyance speed in a drying step, the amount of solvent in a varnish, and the like) of the optical film. When the optical film further includes a hard coat layer, smoothness of a surface of the hard coat layer can be improved to suppress scattering and the like on the surface of the hard coat layer, thereby adjusting the smoothness. The smoothness of the hard coat layer can be adjusted, for example, by adjustment of a type of solvent, a component ratio, adjustment of a solid content, addition of a leveling agent, and the like, in addition to the method of adjusting smoothness of an optical film.

Further, the optical film of the present invention satisfies Formulae (1) to (3) for at least one surface of the optical film, and preferably satisfies Formulae (1) to (3) for both surfaces of the optical film. If Formulae (1) to (3) are satisfied for both surfaces, for example, the visibility in the wide angle direction is excellent regardless of which of surfaces of the optical film is adopted as an image display surface of an electronic device.

[2. Bending Resistance of Reflection Image Clarity Value]

In particular, when the optical film of the present invention is applied to a front plate of a flexible device, an absolute value $\Delta C_{MD}$ of a difference in first reflection image clarity values and an absolute value $\Delta C_{TD}$ of a difference in second reflection image clarity values before and after a bending resistance test in accordance with JIS K 5600-5-1 each are preferably less than 15. If the difference in the reflection image clarity values before and after the bending resistance test is less than 15, in particular, it is excellent in visibility in the wide angle direction even when the image display surface of the flexible device is used in a bent state and/or even after the image display surface is used in a bent state The $\Delta C_{MD}$ is preferably less than 15, more preferably less than 14, and still more preferably less than 13. The $\Delta C_{TD}$ is more preferably less than 15, still more preferably less than 14, and particularly preferably less than 13.

[3. Total Light Transmittance]

The total light transmittance of the optical film of the present invention is 85% or more, preferably 87% or more, more preferably 89% or more, still more preferably 90% or more, and 100% or less from the viewpoint of further improving visibility. The total light transmittance of the optical film can be measured in accordance with JIS K 7136-1:1997. The measurement method of the total light transmittance will be described in detail with reference to Examples.

[4. Haze, Difference in Haze]

The haze of the optical film of the present invention is 0.5% or less, preferably 0.4% or less, more preferably 0.3% or less, still more preferably 0.2% or less, from the viewpoint of further improving visibility.

In the optical film of the present invention, an absolute value ΔHaze, a difference in the hazes before and after a bending test in accordance with JIS K 5600-5-1 is preferably 0.3% or less and more preferably 0.2% or less.

The haze of the optical film can be measured in accordance with JIS K 7136:2000. The measurement method of the haze and the calculation method of the difference in hazes will be described in detail in Examples.

Yellow index (YI) of the optical film of the present invention is 4.0 or less, preferably 3.0 or less, more preferably 2.5 or less, still more preferably 2.0 or less, from the viewpoint of further improving visibility. The measurement method of the YI will be described in detail with reference to Examples.

[5. Number of Times of Bending]

The number of times of bending of the optical film of the present invention is preferably 20,000 times or more, more preferably 100,000 times or more, still more preferably 200,000 times or more, particularly preferably 350,000 times or more, and highly particularly preferably 700,000 times or more, from the viewpoint of improving folding endurance. If the number of times of bending is a lower limit or more, cracks, breakages or the like hardly occur even when the optical film is bent. In addition, the upper limit of the number of times of bending is usually 50,000,000 times or less. The number of times of bending of the optical film is measured by an MIT folding endurance fatigue test in accordance with ASTM standard D2176-16. The MIT folding endurance fatigue test is, for example, a test described in Examples.

[6. Thickness]

The thickness of the optical film of the present invention is preferably 10 μm or more, more preferably 20 μm or more, still more preferably 25 μm or more, and particularly preferably 30 μm or more, and preferably 150 μm or less, more preferably 100 μm or less, and still more preferably 85 μm or less. The measurement method of the thickness will be described in detail with reference to Examples.

[7. Tensile Modulus]

The tensile modulus at 80° C. of the optical film of the present invention is preferably 4,000 to 9,000 MPa, and more preferably 4,500 to 8,500 MPa. The measurement method of the tensile modulus will be described in detail with reference to Examples. When the tensile modulus is in the above range, dent defects hardly occur in the optical film. The tensile modulus of the optical film can be measured in accordance with JIS K 7127. The measurement method of the tensile modulus will be described in detail with reference to Examples.

[8. Hard Coat Layer]

The optical film of the present invention preferably has the hard coat layer on at least one surface thereof. When the hard coat layer is provided on both surfaces of the optical film, the two hard coat layers may contain the same or different components.

Examples of the hard coat layer include the well-known hard coat layers, such as an acrylic-based layer, an epoxy-based layer, a urethane-based layer, a benzyl chloride-based layer, and a vinyl-based layer. Among them, the hard coat layers of the acrylic-based layer, the urethane-based layer, and a combination thereof can be preferably used, from the viewpoint of suppressing the decrease in the visibility of the optical film in the wide angle direction and improving the bending resistance. The hard coat layer is formed by polymerizing and curing a curable compound by irradiation of active energy rays. Examples of the polymerizable compound include a polyfunctional (meth)acrylate-based compound. The polyfunctional (meth)acrylate-based compound is a compound having at least two (meth)acryloyloxy groups in a molecule thereof.

Examples of the polyfunctional (meth)acrylate-based compound include ethylene glycol di(meth)acrylate, diethylene glycol di(meth)acrylate, 1,6-hexanediol di(meth)acrylate, neopentyl glycol di(meth)acrylate, trimethylol propane tri(meth)acrylate, trimethylol ethane tri(meth)acrylate, tetramethylol methane tri(meth)acrylate, tetramethylol methane tetra(meth)acrylate, pentaglycerol tri(meth)acrylate, pentaerythritol tri(meth)acrylate, pentaerythritol tetra (meth)acrylate, glycerin tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tris((meth)acryloyloxyethyl)isocyanurate; a phosphazene-based (meth)acrylate compound having a (meth)acryloyloxy group introduced into the phosphazene ring of the phosphazene compound; a urethane (meth) acrylate compound obtained by reaction of polyisocyanate having at least two isocyanate groups in the molecule with a polyol compound having at least one (meth)acryloyloxy group and hydroxyl group in the molecule; a polyester (meth)acrylate compound obtained by reaction of a polyol compound having at least two carboxylic acid halide and at least one (meth)acryloyloxy group and hydroxyl group in the molecule; oligomers such as a dimer and a trimer of each of the compounds, and the like. These compounds may each be used alone or in combination of two or more.

The curable compound may contain monofunctional (meth)acrylate-based compounds in addition to the polyfunctional (meth)acrylate-based compounds. Examples of the monofunctional (meth)acrylate-based compounds include hydroxyethyl (meth)acrylate, 2-hydroxyethyl (meth) acrylate, 2-hydroxypropyl (meth)acrylate, hydroxybutyl (meth)acrylate, 2-hydroxy-3-phenoxypropyl (meth)acrylate, glycidyl (meth)acrylate and the like. These compounds may be used alone or in combination of two or more. The content of the monofunctional (meth)acrylate-based compound is preferably 10% by mass or less when the solid content of the compound contained in the curable composition is 100% by mass. Note that in this specification, the solid content means all the components except the solvent contained in the curable composition.

The curable composition which forms the hard coat layer may contain additives, in addition to the polyfunctional (meth)acrylate-based compounds and a polymerizable oligomer. Examples of the additives include a polymerization initiator, silica, a leveling agent, a solvent and the like. Examples of the solvent include methyl ethyl ketone, polypropylene glycol monomethyl ether and the like.

In addition, the curable compound may also contain the polymerizable oligomer. A hardness of the hard coat layer can be adjusted by containing the polymerizable oligomer. Examples of the polymerizable oligomers can include a macromonomer such as terminal (meth)acrylate polymethyl methacrylate, terminal styryl poly (meth)acrylate, terminal (meth)acrylate polystyrene, terminal (meth)acrylate polyethylene glycol, a terminal (meth)acrylate acrylonitrile-styrene copolymer, and a terminal (meth)acrylate styrene-methyl (meth)acrylate copolymer. The content of the polymerizable oligomer is preferably 5 to 50% by mass when the solid content of the compound contained in the curable composition is 100% by mass.

The thickness of the hard coat layer is preferably 3 to 30 μm, more preferably 5 to 25 μm, and still more preferably 5 to 20 μm from the viewpoint of improving the hardness of the optical film.

[9. Protective Film]

In one embodiment of the present invention, the optical film may have a protective film on at least one surface (one surface or both surfaces). For example, when a functional layer is provided on one surface of the optical film, the protective film may be laminated on the surface on the optical film or the surface on the functional layer, and laminated on both surfaces of the optical film and the functional layer. When the functional layers are provided on both surfaces of the optical film, the protective film may be laminated on the surface on one functional layer, or may be laminated on the surfaces on both functional layers. The protective film is a film for temporarily protecting the surface of the optical film or the functional layer, and is not particularly limited as long as it is a peelable film capable of protecting the surface of the optical film or the functional layer. Examples of the protective film include polyester-based resin films such as polyethylene terephthalate, polybutylene terephthalate, and polyethylene naphthalate, polyolefin-based resin films such as polyethylene and polypropylene films, acrylic-based resin films and the like, and is preferably selected from the group consisting of the polyolefin-based resin films, the polyethylene terephthalate-based resin films, and the acrylic-based resin films. When the optical film has two protective films, each protective film may be the same or different.

The thickness of the protective film is not particularly limited, but is usually 10 to 120 μm, preferably 10 to 110 μm, and more preferably 15 to 100 μm. When the optical film has two protective films, the thickness of each protective film may be the same or different.

[10. Polyimide, Polyamide-Based Resin]

The optical film of the present invention contains at least one resin selected from the group consisting of a polyimide-based resin and a polyamide-based resin. The polyimide-based resin is a resin (hereinafter, sometimes referred to as polyimide resin) containing a repeating structural unit containing an imide group, and indicates at least one resin selected from the group consisting of a resin (hereinafter, sometimes referred to as a polyamideimide resin) containing a repeating structural unit containing both the imide group and an amide group. In addition, the polyamide-based resin shows a resin (hereinafter, sometimes referred to as a polyamide-based resin hereafter) containing the repeating structural unit containing the amide group.

The polyimide-based resin preferably has a repeating structural unit represented by Formula (10). Here, G is a tetravalent organic group, and A is a divalent organic group. The polyimide-based resin may contain two or more types of repeating structural units represented by Formula (10) in which G and/or A is different.

[Chem. 1]

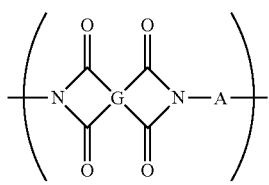

(10)

The polyimide-based resin includes at least one repeating structural unit selected from the group consisting of repeating structural units represented by Formula (11), Formula (12), and Formula (13), in a range in which various physical properties of the optical film are not impaired.

[Chem. 2]

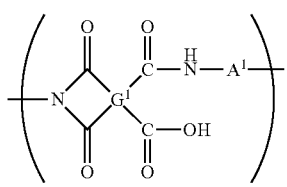

(11)

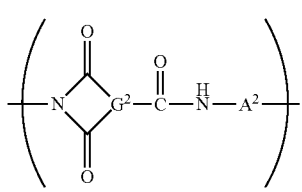

(12)

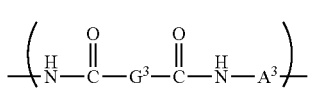

(13)

[Chem. 3]

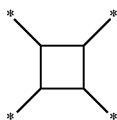

(20)

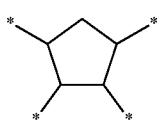

(21)

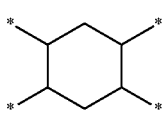

(22)

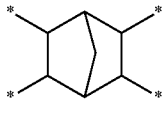

(23)

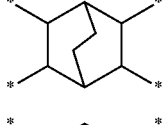

(24)

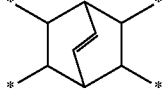

(25)

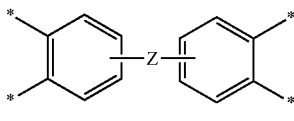

(26)

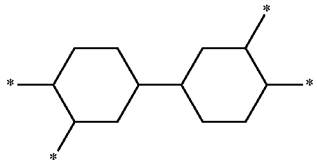

(27)

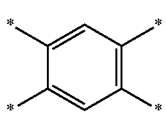

(28)

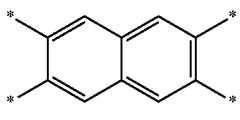

(29)

In Formulas (10) and (11), G and $G^1$ each independently represent a tetravalent organic group and preferably an organic group which may be substituted into a hydrocarbon group or a fluorine-substituted hydrocarbon group. As G and $G^1$, groups represented by Formula (20), Formula (21), Formula (22), Formula (23), Formula (24), Formula (25), Formula (26), Formula (27), Formula (28), or Formula (29) and a tetravalent chain hydrocarbon group having 6 or less carbon atoms are exemplified. Among them, since the yellow index (YI value) of the optical film tends to be suppressed, among them, the groups represented by Formula (20), Formula (21), Formula (22), Formula (23), Formula (24), Formula (25), Formula (26), or Formula (27) are preferable.

In formulas (20) to (29),

* represents a bond,

Z represents a single bond, —O—, —CH$_2$—, —CH$_2$—CH$_2$—, —CH(CH$_3$)—, —C(CH$_3$)$_2$—, —C(CF$_3$)$_2$—, —Ar—, —SO$_2$—, —CO—, —O—Ar—O—, —Ar—O—Ar—, —Ar—CH$_2$—Ar—, —Ar—C(CH$_3$)$_2$—Ar— or —Ar—SO$_2$—Ar—. Ar represents an arylene group which may be substituted into a fluorine atom and has 6 to 20 carbon atoms, and a specific example thereof includes a phenylene group.

In Formula (12), $G^2$ is a trivalent organic group, preferably an organic group which may be substituted into a hydrocarbon group or a fluorine-substituted hydrocarbon group. As $G^2$, a group in which any one of bonds of groups represented by Formula (20), Formula (21), Formula (22), Formula (23), Formula (24), Formula (25), Formula (26), Formula (27), Formula (28), or Formula (29) is substituted into a hydrogen atom and a trivalent chain hydrocarbon group having 6 or less carbon atoms are exemplified.

In Formula (13), $G^3$ is a divalent organic group, and preferably an organic group which may be substituted into a hydrocarbon group or a fluorine-substituted hydrocarbon group. As $G^3$, a group in which, of bonds of groups represented by Formula (20), Formula (21), Formula (22), Formula (23), Formula (24), Formula (25), Formula (26), Formula (27), Formula (28), or Formula (29), two bonds which are not adjacent to each other are substituted into a hydrogen atom and a chain hydrocarbon group having 6 or less carbon atoms are exemplified.

In Formulas (10) to (13), A, $A^1$, $A^2$, and $A^3$ each independently represent a divalent organic group and preferably an organic group which may be substituted into a hydrocarbon group or a fluorine-substituted hydrocarbon group. As A, $A^1$, $A^2$, and $A^3$, a group represented by Formula (30), Formula (31), Formula (32), Formula (33), Formula (34), Formula (35), Formula (36), Formula (37), or Formula (38); a group substituted into a methyl group, a fluoro group, a chloro group, or a trifluoromethyl group; and a chain hydrocarbon group having 6 or less carbon atoms are exemplified.

[Chem. 4]

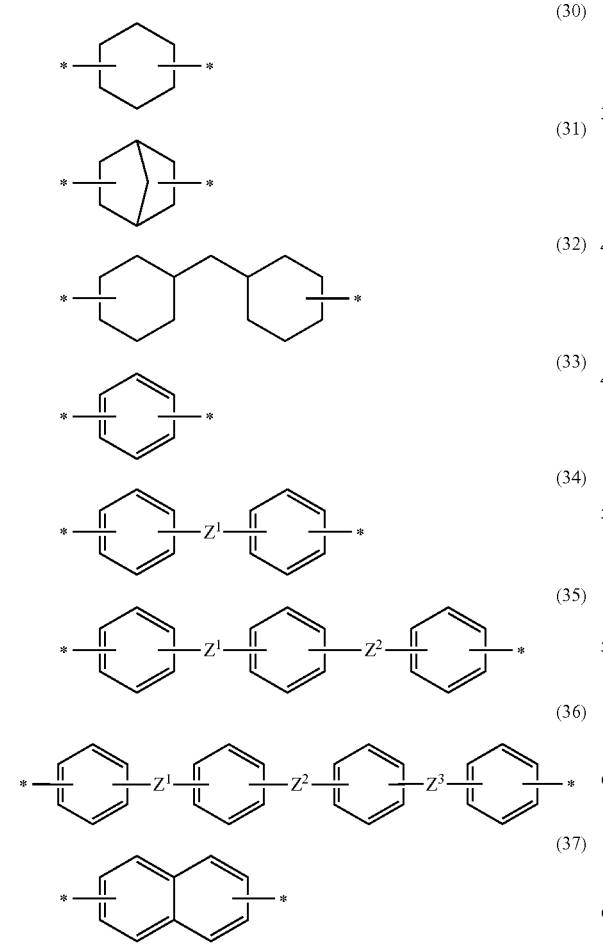

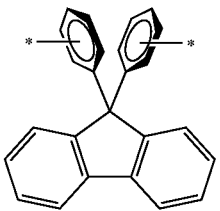

In formulas (30) to (38),
* represents a bond,
$Z^1$, $Z^2$, and $Z^3$ each independently represent a single bond, —O—, —CH$_2$—, —CH$_2$—CH$_2$—, —CH(CH$_3$)—, —C(CH$_3$)$_2$—, —C(CF$_3$)$_2$—, —SO$_2$—, or —CO—.

One example is that $Z^1$ and $Z^3$ are —O—, and $Z^2$ is —CH$_2$—, —C(CH$_3$)$_2$—, —C(CF$_3$)$_2$—, or —SO$_2$—. Bonding positions of each of $Z^1$ and $Z^2$ to each ring and bonding positions of each of $Z^2$ and $Z^3$ to each ring are preferably a meta- or para-position to each ring.

The polyimide-based resin is preferably a polyamideimide resin having at least repeating structural unit represented by Formula (10) and the repeating structural unit represented by Formula (13) from the viewpoint of easily improving the visibility. In addition, the polyamide-based resin preferably has at least the repeating structural unit represented by Formula (13).

In one embodiment of the present invention, the polyimide-based resin is a condensation type polymer obtained by reacting (polycondensating) a diamine and a tetracarboxylic acid compound (acid chloride compound, tetracarboxylic acid compound analogues such as tetracarboxylic acid dianhydride), and, if necessary, a dicarboxylic acid compound (dicarboxylic acid compound analogues such as an acid chloride compound), a tricarboxylic acid compound (acid chloride compound, tricarboxylic acid compound analogues such as a tricarboxylic acid anhydride) and the like. The repeating structural unit represented by Formula (10) or Formula (11) is usually derived from the diamine and the tetracarboxylic acid compound. The repeating structural unit represented by Formula (12) is usually derived from the diamine and the tricarboxylic acid compound. The repeating structural unit represented by Formula (13) is usually derived from the diamine and the dicarboxylic acid compound.

In one embodiment of the present invention, the polyamide-based resin is the condensation type polymer obtained by reacting (polycondensating) the diamine and the dicarboxylic acid compound. That is, the repeating structural unit represented by Formula (13) is usually derived from the diamine and the dicarboxylic acid compound.

Examples of the tetracarboxylic acid compound include aromatic tetracarboxylic acid compounds such as an aromatic tetracarboxylic acid dianhydride; aliphatic tetracarboxylic acid compounds such as an aliphatic tetracarboxylic acid dianhydride, and the like. The tetracarboxylic acid compound may be used alone or in combination of two or more. The tetracarboxylic acid compound may be tetracarboxylic acid compound analogues such as an acid chloride compound other than a dianhydride.

Specific examples of the aromatic tetracarboxylic acid dianhydride include 4,4'-oxydiphthalic acid dianhydride, 3,3',4,4'-benzophenonetetracarboxylic acid dianhydride, 2,2',3,3'-benzophenonetetracarboxylic acid dianhydride, 3,3',4,4'-biphenyltetracarboxylic acid dianhydride, 2,2',3,3'- biphenyltetracarboxylic acid dianhydride, 3,3',4,4'-diphenylsulfonetetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenoxyphenyl)propane dianhydride, 4,4'-(hexafluoroisopropylidene)diphthalic dianhydride (6FDA), 1,2-bis(2,3-dicarboxyphenyl)ethane dianhydride, 1,1-bis(2,3-dicarboxyphenyl)ethane dianhydride, 1,2-bis(3,4-dicarboxyphenyl)ethane dianhydride, 1,1-bis(3,4-dicarboxyphenyl)ethane dianhydride, bis(3,4-dicarboxyphenyl)methane dianhydride, bis(2,3-dicarboxyphenyl)methane dianhydride, 4,4'-(p-phenylenedioxy)diphthalic acid dianhydride, and 4,4'-(m-phenylenedioxy)diphthalic acid dianhydride. These can be used alone or in combination of two or more.

The aliphatic tetracarboxylic acid dianhydride includes cyclic or non-cyclic aliphatic tetracarboxylic acid dianhydrides. The cycloaliphatic tetracarboxylic acid dianhydride is a tetracarboxylic acid dianhydride having an alicyclic hydrocarbon structure, and specific examples thereof include cycloalkanetetracarboxylic acid dianhydrides such as 1,2,4,5-cyclohexanetetracarboxylic acid dianhydride, 1,2,3,4-cyclobutanetetracarboxylic acid dianhydride, and 1,2,3,4-cyclopentanetetracarboxylic acid dianhydride, bicyclo[2.2.2]oct-7-ene-2,3,5,6-tetracarboxylic acid dianhydride, dicyclohexyl-3,3',4,4'-tetracarboxylic acid dianhydride, and a regioisomer thereof. These can be used alone or in combination of two or more. Specific examples of the acyclic aliphatic tetracarboxylic acid dianhydrides include 1,2,3,4-butanetetracarboxylic acid dianhydride, 1,2,3,4-pentanetetracarboxylic acid dianhydride and the like, and these can be used alone or in combination of two or more. In addition, the cycloaliphatic tetracarboxylic acid dianhydride and the acyclic aliphatic tetracarboxylic acid dianhydride may be used in combination.

Among the tetracarboxylic acid dianhydrides, from the viewpoint of high transparency and low colorability, 1,2,4,5-cyclohexanetetracarboxylic acid dianhydride, bicyclo[2.2.2]oct-7-ene-2,3,5,6-tetracarboxylic acid dianhydride, and 4,4'-(hexafluoroisopropylidene)diphthalic acid dianhydride, and mixtures thereof are preferable. In addition, as the tetracarboxylic acid, a water adduct of an anhydride of the tetracarboxylic acid compound may be used.

Examples of the tricarboxylic acid compounds include aromatic tricarboxylic acid, aliphatic tricarboxylic acid, and acid chloride compounds of analogues thereof, acid anhydrides and the like, and two or more thereof may be used in combination.

Specific examples thereof include anhydrides of 1,2,4-benzenetricarboxylic acid; 2,3,6-naphthalenetricarboxylic acid-2,3-anhydride; and a compound in which phthalic anhydride and benzoic acid are linked by a single bond, —CH$_2$—, —C(CH$_3$)$_2$—, —C(CF$_3$)$_2$—, —SO$_2$—, or a phenylene group.

Examples of the tricarboxylic acid compounds include aromatic dicarboxylic acid, aliphatic dicarboxylic acid, and acid chloride compounds of analogues thereof, acid anhydrides and the like, and two or more thereof may be used in combination. Specific examples thereof include terephthalic acid dichloride (terephthaloyl chloride (TPC)); isophthalic acid dichloride; naphthalenedicarboxylic acid dichloride; 4,4'-biphenyldicarboxylic acid dichloride; 3,3'-biphenyldicarboxylic acid dichloride; 4,4'-oxybis(benzoyl chloride) (OBBC); and a dicarboxylic acid compound of a chain hydrocarbon having 8 or less carbon atoms and a compound in which two benzoic acids are linked by a single bond, —CH$_2$—, —C(CH$_3$)$_2$—, —C(CF$_3$)$_2$—, —SO$_2$—, or a phenylene group.

Examples of the diamine include an aliphatic diamine, an aromatic diamine, or a mixture thereof. In the present embodiment, the "aromatic diamine" refers to a diamine in which an amino group is directly bonded to an aromatic ring, and a part of the structure thereof may contain an aliphatic group or other substituents. The aromatic ring may be a single ring or a condensed ring, and examples thereof include a benzene ring, a naphthalene ring, an anthracene ring, and a fluorene ring, but are not limited thereto. Among them, the aromatic ring is preferably a benzene ring. In addition, the "aliphatic diamine" refers to a diamine in which an amino group is directly bonded to an aliphatic group, and a part of the structure thereof may contain an aromatic ring or other substituents.

Examples of the aliphatic diamine include acyclic aliphatic diamines such as hexamethylene diamine, cycloaliphatic diamines such as 1,3-bis(aminomethyl)cyclohexane, 1,4-bis(aminomethyl)cyclohexane, norbornane diamine, 4,4'-diaminodicyclohexylmethane and the like. These can be used alone or in combination of two or more.

Examples of the aromatic diamine include aromatic diamines having one aromatic ring such as p-phenylenediamine, m-phenylenediamine, 2,4-toluenediamine, m-xylylenediamine, p-xylylenediamine, 1,5-diaminonaphthalene, and 2,6-diaminonaphthalene; and aromatic diamines having two or more aromatic rings such as 4,4'-diaminodiphenylmethane, 4,4'-diaminodiphenylpropane, 4,4'-diaminodiphenylether, 3,4'-diaminodiphenylether, 3,3'-diaminodiphenylether, 4,4'-diaminodiphenyl sulfone, 3,4'-diaminodiphenyl sulfone, 3,3'-diaminodiphenyl sulfone, 1,4-bis(4-aminophenoxy)benzene, 1,3-bis(4-aminophenoxy)benzene, 4,4'-diaminodiphenyl sulfone, bis[4-(4-aminophenoxy)phenyl]sulfone, bis[4-(3-aminophenoxy) phenyl]sulfone, 2,2-bis[4-(4-aminophenoxy)phenyl]propane, 2,2-bis[4-(3-aminophenoxy)phenyl]propane, 2,2'-dimethylbenzidine, 2,2'-bis(trifluoromethyl)benzidine(2,2'-bis(trifluoromethyl)-4,4'-diaminodiphenyl (TFMB)), 4,4'-bis(4-aminophenoxy)biphenyl, 9,9-bis(4-aminophenyl)fluorene, 9,9-bis(4-amino-3-methylphenyl)fluorene, 9,9-bis(4-amino-3-chlorophenyl)fluorene, and 9,9-bis(4-amino-3-fluorophenyl)fluorene. These can be used alone or in combination of two or more.

Among the above diamines, from the viewpoint of high transparency and low colorability, it is preferable to use one or more selected from the group consisting of aromatic diamines having a biphenyl structure, it is more preferable to use one or more selected from the group consisting of 2,2'-dimethylbenzidine, 2,2'-bis(trifluoromethyl)benzidine, 4,4'-bis(4-aminophenoxy)biphenyl, and 4,4'-diaminodiphenylether, and it is still more preferable to use 2,2'-bis(trifluoromethyl)benzidine.

The polyimide-based resin is obtained by mixing the respective raw materials such as the diamine, the tetracarboxylic acid compound, the tricarboxylic acid compound, and the dicarboxylic acid compound according to the conventional method, for example, the methods such as stirring and then imidizing the resulting intermediate under the presence of an imidized catalyst and a dehydrating agent as needed. The polyamide-based resin can be obtained by mixing the respective raw materials such as the diamine and the dicarboxylic acid compound according to the conventional method, for example, the methods such as stirring.

The imidized catalyst used in a imidizing step is not particularly limited, and examples thereof include aliphatic amines such as tripropylamine, dibutylpropylamine and ethyldibutylamine; alicyclic amines (monocyclic) such as N-ethylpiperidine, N-propylpiperidine, N-butylpyrrolidine, N-butylpiperidine, and N-propylhexahydroazepine; alicyclic amines (polycyclic) such as azabicyclo[2.2.1]heptane, azabicyclo[3.2.1]octane, azabicyclo[2.2.2]octane, and azabicyclo[3.2.2]nonane; and aromatic amines such as 2-methylpyridine, 3-methylpyridine, 4-methylpyridine, 2-ethylpyridine, 3-ethylpyridine, 4-ethylpyridine, 2,4-dimethylpyridine, 2,4,6-trimethylpyridine, 3,4-cyclopentenopyridine, 5,6,7,8-tetrahydroisoquinoline and isoquinoline.

The dehydrating agent used in the imidizing step is not particularly limited, but examples thereof include an acetic anhydride, a propionic acid anhydride, an isobutyric acid anhydride, a pivalic acid anhydride, a butyric acid anhydride, an isovaleric acid anhydride and the like.

The reaction temperature in the mixing and imidizing steps of the respective raw materials is not particularly limited, but is, for example, 15 to 350° C. and preferably 20 to 100° C. The reaction time is also not particularly limited, but is, for example, about 10 minutes to 10 hours. If necessary, the reaction may be performed under conditions of inert atmosphere or reduced pressure. In addition, the reaction may be performed in a solvent, and examples of the solvent include those exemplified as the solvent used for the preparation of the varnish. After the reaction, the polyimide-based resin or the polyamide-based resin is purified. Examples of the purification method include a method of adding a poor solvent to a reaction solution to deposit a resin by a reprecipitation, drying the deposited resin, taking out precipitates, and if necessary, washing the precipitates with a solvent such as methanol and drying the precipitates.

Note that for the production of the polyimide-based resin, reference may be made to, for example, the production method described in JP-A-2006-199945 or JP-A-2008-163107. In addition, as the polyimide-based resin, commercially available products can also be used, and a specific example of the polyimide-based resin item include neoprim (registered trademark) manufactured by MITSUBISHI GAS CHEMICAL COMPANY, INC., KPI-MX300F manufactured Kawamura Sangyo Co., Ltd., and the like.

The weight average molecular weight of the polyimide-based resin or the polyamide-based resin is preferably 200,000 or more, more preferably 250,000 or more, still more preferably 300,000 or more, and particularly preferably 350,000 or more, and preferably 600,000 or less, more preferably 550,000 or less, still more preferably 500,000 or less, and particularly preferably 450,000 or less. The larger the weight average molecular weight of the polyimide-based resin or the polyamide-based resin, the easier the expression of the high bending resistance at the time of film formation. Therefore, from the viewpoint of enhancing the bending resistance of the optical film, it is preferable that the weight average molecular weight is the lower limit or higher. On the other hand, as the weight average molecular weight of the polyimide-based resin or the polyamide-based resin is reduced, the viscosity of the varnish tends to be low and processability tends to be improved. In addition, stretchability of the polyimide-based resin or polyamide-based resin tends to be improved. Therefore, from the viewpoint of the processability and the stretchability, it is preferable that the weight average molecular weight is the upper limit or lower. Note that in the present application, the weight average molecular weight can be measured by gel permeation chromatography (GPC) and determined by standard polystyrene conversion, and can be calculated, for example, by the method described in Examples. Two or more types of polyimide-based resins or polyamide-based resins may be mixed and used.

The imidization rate of the polyimide-based resin in the optical film is preferably 95 to 100%, more preferably 97 to 100%, still more preferably 98 to 100%, and particularly preferably 100%. From the viewpoint of the stability of the varnish and the mechanical properties of the obtained optical film, it is preferable that the imidization ratio is the lower limit or higher. Note that the imidization rate can be determined by an IR method, an NMR method or the like. From the above viewpoint, the imidization rate of the polyimide-based resin contained in the varnish is preferably in the above range.

In a preferred embodiment of the present invention, the polyimide-based resin or the polyamide-based resin contained in the optical film of the present invention may contain a halogen atom such as a fluorine atom which can be introduced, for example, by the fluorine-containing substituent and the like. When the polyimide-based resin or the polyamide-based resin contains a halogen atom, it is easy to improve the modulus of elasticity of the optical film and reduce the yellow index (YI value). When the modulus of elasticity of the optical film is high, the occurrence of flaws and wrinkles and the like in the film is easily suppressed, and when the yellow index of the optical film is low, the transparency of the film is easily improved. The halogen atom is preferably a fluorine atom. Preferred examples of the fluorine-containing substituent in order to make the polyimide-based resin or the polyamide-based resin contain the fluorine atom include a fluoro group and a trifluoromethyl group.

The content of the halogen atom in the polyimide-based resin or the polyamide-based resin is preferably 1 to 40% by mass, more preferably 5 to 40% by mass, and still more preferably 5 to 30% by mass, based on the mass of the polyimide-based resin or the polyamide-based resin. If the content of the halogen atom is in the above range, the modulus of elasticity at the time of the film formation is further improved, a coefficient of water absorption is reduced, the yellow index (YI value) is further reduced, and the transparency is more easily improved, and furthermore, the synthesis tends to be difficult.

In one embodiment of the present invention, the content of the polyimide-based resin and/or the polyamide-based resin in the optical film is preferably 40% by mass or more, more preferably 50% by mass or more, and still more preferably 70% by mass or more based on the total mass of the optical film. It is preferable that the content of the polyimide-based resin and/or the polyamide-based resin is the lower limit or higher from the viewpoint of easily improving the bending resistance and the like. Note that the content of the polyimide-based resin and/or the polyamide-based resin in the optical film is usually 100% by mass or less based on the total mass of the optical film.

The optical film of the present invention preferably contains two or more resins selected from the group consisting of the polyimide-based resins and the polyamide-based resins. When the optical film contains the two or more resins, in other words, for example, when the varnish contains the two or more resins in the method for producing an optical film described later, the viscosity of the varnish can be easily adjusted to an appropriate range. In particular, it becomes easy to apply a varnish to a substrate in an application step of the production method to form a uniform coating film. As a result, the produced optical film can be easily adjusted to the range of Formulae (1) to (3). In such a case, the visibility of the optical film in the wide angle direction is further improved.

The two or more resins are, for example, two or more polyimide-based resins, two or more polyamide-based resins, and a combination of one or more polyimide-based resins and one or more polyamide-based resins.

In particular, among the two or more resins, the two or more resins are preferably two or more polyimide-based resins or two or more polyamide-based resins having weight average molecular weights different from each other. Among the two or more polyimide-based resins or the two or more polyamide-based resins, the weight average molecular weight of at least one polyimide-based resin or at least one polyamide-based resin may be 250,000 to 500,000, and the weight average molecular weight of another at least one polyimide-based resin or another at least one polyamide-based resin may be 200,000 to 450,000.

In particular, among the two or more resins, the two or more resins are more preferably two polyimide-based resins or two polyamide-based resins having weight average molecular weights different from each other. Among the two polyimide-based resins or the two polyamide-based resins, the weight average molecular weight of one polyimide-based resin or one polyamide-based resin may be 250,000 to 500,000, and the weight average molecular weight of the other polyimide-based resin or the other polyamide-based resin may be 200,000 to 450,000.

When the optical film contains the two polyimide-based resins or the two polyamide-based resins, a weight ratio (former/latter) of the weight ratio of one polyimide-based resin or one polyamide-based resin and the other polyimide-based resin or the other polyamide-based resin can be appropriately selected according to the type of resins and the desired solid content concentration of the varnish, which may be, for example, 5/95 to 95/5.

[11. Additive]

The optical film of the present invention may further contain additives. Examples of the additives include a filler, an ultraviolet absorbent, a brightener, an antioxidant, a pH adjusting agent, and a leveling agent. However, it is preferable that the optical film of the present invention is substantially free of a filler (for example, silica particles). Specifically, the content of the filler relative to the optical film is 5% by mass or less, preferably 3% or less, and more preferably 1% or less.

(Ultraviolet Absorbent)

The optical film of the present invention may further contain ultraviolet absorbents. Examples of the ultraviolet absorbents include a triazine-based ultraviolet absorbent, a benzophenone-based ultraviolet absorbent, a benzotriazole-based ultraviolet absorbent, a benzoate-based ultraviolet absorbent, and a cyanoacrylate-based ultraviolet absorbent. These may be used alone or in combination of two or more. Examples of the appropriate ultraviolet absorbent commercially available include Sumibarb (registered trademark) 340 manufactured by Sumika Chemtex Co., Ltd., Adekastab (registered trademark) LA-31 manufactured by ADEKA Co., Ltd., and Tinuvin (registered trademark) 1577 manufactured by BASF Japan Co. Ltd, and the like. The content of the ultraviolet absorbent is preferably 1 phr or more and 10 phr or less, and more preferably 3 phr or more and 6 phr or less, based on the mass of the resin contained in the optical film of the present invention.

The applications of the optical film of the present invention are not particularly limited, and the optical film may be used for various applications. The optical film of the present invention may be a single layer or a laminate as described above, and the optical film of the present invention may be used as it is, and furthermore, may be used as a laminate with another film. Since the optical film of the present invention has excellent surface quality, the optical film is useful as an optical film in an image display device or the like. Note that when the optical film is a laminate, the optical film is referred to as an optical film including all layers laminated on one surface or both surfaces of the optical film.

The applications of the optical film of the present invention are not particularly limited, and the optical film may be used for various applications. Since the optical film of the present invention has excellent visibility in a wide angle direction, the optical film is useful as an optical film in an image display device or the like. In particular, the optical film of the present invention is useful as a front plate of an image display device, in particular, a front plate (window film) of a flexible display. The flexible display has, for example, a flexible functional layer, and the optical film which is superimposed on the flexible functional layer and functions as the front plate. That is, the front plate of the flexible display is disposed on a viewing side on the flexible functional layer. This front plate has a function of protecting the flexible functional layer.

[12. Method of Production Optical Film]

The optical film of the present invention is not particularly limited, but can be produced by a method including, for example, the following steps:

(a) preparing a liquid (hereinafter sometimes referred to as a varnish) containing the resin and the filler (varnish preparation step), (b) applying the varnish to a substrate to form a coating film (application step), and (c) drying the applied liquid (coating film) to form an optical film (optical film forming step).

In the varnish preparation step, the resin is dissolved in a solvent, and the filler and, if necessary, other additives are added and stirred and mixed to prepare the varnish.

The solvent used for the preparation of the varnish is not particularly limited as long as the resin can be dissolved. Examples of the solvents include amide-based solvents such as N,N-dimethylacetamide (DMAc), N,N-dimethylformamide; lactone-based solvents such as γ-butyrolactone (GBL) and γ-valerolactone; sulfur-containing solvents such as dimethyl sulfone, dimethyl sulfoxide, and sulfolane; carbonate-based solvents such as ethylene carbonate and propylene carbonate; and combinations thereof. Among them, the amide-based solvents or the lactone-based solvents are preferable. These solvents may be used alone or in combination of two or more. In addition, the varnish may also contain water, an alcohol-based solvent, a ketone-based solvent, an acyclic ester-based solvent, an ether-based solvent and the like. The solid content concentration of the varnish is preferably 1 to 25% by mass and more preferably 5 to 20% by mass.

In the application step, the varnish is applied to the substrate by the known application method to form a coating film. Examples of the known application methods include a wire bar coating method, a roll coating method such as reverse coating and gravure coating, a die coating method, a comma coating method, a lip coating method, a screen coating method, a fountain coating method, and a flow forming method and the like.

In the optical film formation step, the optical film is formed by drying the coating film (referred to as first drying), and further peeling the coating film from the substrate and then drying the dried coating film (referred to as second drying or post-baking treatment). The first drying may be carried out under the conditions of inert atmosphere or reduced pressure, as necessary. The first drying is preferably performed at a relatively low temperature over time. When the first drying is performed at a relatively low temperature over time, the reflection image clarity value of the produced optical film tends to satisfy the above Formulae (1) to (3).

Here, when the optical film of the present invention is industrially produced, the actual production environment may be often disadvantageous in enhancing the visibility in the wide angle direction as compared with the production environment at a laboratory level, and as a result, it is difficult to improve the visibility of the optical film in the wide angle direction. As described above, the fact that it is preferable to perform the first drying at the relatively low temperature over time is as described above, but at the laboratory level, when the first drying is performed, since the drying can be performed in a closed drier, the surface of the optical film is relatively less likely to be roughened due to external factors. On the other hand, when the optical film is industrially produced, for example, since it is necessary to heat a large area in the first drying, an air blower may be used at the time of heating. As a result, the surface state of the optical film tends to be roughened, and it is difficult to improve the visibility of the optical film in the wide angle direction.

In the case of performing drying by heating, particularly considering external factors when the optical film is industrially produced, the first drying temperature is preferably 60 to 150° C., more preferably 60 to 130° C., and still more preferably 70 to 120° C. The first drying time is preferably 5 to 60 minutes and more preferably 10 to 40 minutes. In particular, considering the external factors as described above when the optical film is industrially produced, it is preferable to perform the first drying under three or more stages of drying temperature conditions. The drying can be performed at the same or different temperature conditions and/or drying time in each stage under the multi-stage condition, and the drying may be performed in, for example, 3 to 10 stages and preferably 3 to 8 stages. When the first drying is performed in three or more stages of multi-stage condition the reflection image clarity value of the produced optical film tends to satisfy Formulae (1) to (3), and the visibility in the wide angle direction is improved. In a mode under three or more stages of multi-stage condition, it is preferable that a temperature profile of the first drying includes temperature rising and temperature falling. That is, it is preferable that the first drying conditions in the optical film forming step are three or more stages of heating temperature conditions in which the temperature profile includes temperature rising and temperature falling. Describing the case of a fourth stage as such a temperature profile as an example, the first drying temperature is 70 to 90° C. (first temperature), 90 to 120° C. (second temperature), 80 to 120° C. (third temperature), and 80 to 100° C. (fourth temperature) in order. In this example, the first drying temperature rises from a first temperature to a second temperature, and then falls from the second temperature to a third temperature, and further falls from the third temperature to a fourth temperature. Here, the first drying time is, for example, 5 to 15 minutes in each stage. The first drying is preferably performed so that the residual amount of solvent of the dried coating film is preferably 5 to 15% by mass, more preferably 6 to 12% by mass. When the residual amount of solvent is in the above range, the peelability of the dried coating film from the substrate becomes good, and the reflection image clarity value of the produced optical film tends to satisfy Formulae (1) to (3).

The second drying temperature is preferably 150 to 300° C., more preferably 180 to 250° C., and still more preferably 180 to 230° C. The second drying time is preferably 10 to 60 minutes and more preferably 30 to 50 minutes.

The second drying may be performed in a single wafer manner, but in the case of industrial production, the second drying may be performed by a roll-to-roll method from the viewpoint of production efficiency. In the single wafer type, it is preferable to perform the drying in a state of being uniformly stretched in an in-plane direction.

In the roll-to-roll method, it is preferable to perform the drying in the state where the dried coating film is stretched state in the conveyance direction from the viewpoint of easily satisfying the range of Formulae (1) to (3), and the transport speed is preferably 0.1 to 5 m/min, more preferably 0.2 to 3 m/min, and still more preferably 0.7 to 2.5 m/min. The second drying may be performed in one stage or multi-stage conditions. The drying can be preferably performed in at least one selected from the same or different temperature conditions, drying time, and a wind speed of hot air in each stage under the multi-stage conditions and may be performed in, for example, 3 to 10 stages and preferably 3 to 8 stages, and it is preferable to perform the drying in the multi-stage conditions from the viewpoint that the optical film tends to satisfy the range of Formulae (1) to (3). In addition, in each stage, the wind speed of the hot air is preferably 5 to 20 m/min, more preferably 10 to 15 m/min, and still more preferably 11 to 14 m/min, from the viewpoint that the reflection image clarity value of the produced optical film tends to satisfy Formulae (1) to (3).

When the optical film of the present invention is provided with the hard coat layer, the hard coat layer can be formed, for example, by applying a curable composition on at least one surface of the optical film to form a coating film, irradiating high energy ray to the coating film, and curing the coating film.

Examples of the substrate include a SUS plate if the substrate is a metal-based substrate, and a PET film, a PEN film, another polyimide-based resin or a polyamide-based resin film, a cycloolefin-based polymer (COP) film, acrylic-based film and the like if the substrate is a resin-based substrate. Among them, the PET film, the COP film and the like are preferable from the viewpoint of excellent smoothness and heat resistance, and furthermore, the PET film is more preferable from the viewpoint of adhesion to the optical film and cost.

When the optical film of the present invention includes the hard coat layer, the hard coat layer is formed, for example, using the composition for forming the hard coat layer. The composition for forming the hard coat layer contains, for example, a monomer and/or an oligomer, a photoinitiator, silica, a leveling agent, and a solvent. Examples of the monomer include a polyfunctional monomer (more specifically, a bifunctional monomer, a trifunctional monomer and the like). Examples of the oligomers include decafunctional urethane oligomers. Examples of the solvent include methyl ethyl ketone, polypropylene glycol monomethyl ether and the like.

In the step of forming the hard coat layer, the hard coat layer is formed by irradiating the high energy ray to the coating film and curing the coating film. The irradiation intensity is appropriately determined by the composition of the curable composition and is not particularly limited, but it is preferable to perform irradiation in a wavelength range in which an activation of a polymerization initiator is effective. The irradiation intensity is preferably 0.1 to 6,000 mW/cm$^2$, more preferably 10 to 1,000 mW/cm$^2$, and still more preferably 20 to 500 mW/cm². If the irradiation intensity is in the above range, an appropriate reaction time can be secured, and yellowing or deterioration of a resin due to heat radiated from the light source and heat generated at the time of the curing reaction can be suppressed. The irradiation time may be appropriately selected according to the composition of the curable composition and is not particularly limited, but an accumulated amount of light represented as the product of the irradiation intensity and the irradiation time is set to be preferably 10 to 10,000 mJ/cm², more preferably 50 to 1,000 mJ/cm², and still more preferably 80 to 500 mJ/cm². If the accumulated amount of light is in the above range, a sufficient amount of active species derived from the polymerization initiator can be generated to allow the curing reaction to proceed more reliably, and furthermore, the irradiation time does not become too long and good productivity can be achieved. In addition, it is useful because the hardness of the hard coat layer can be further increased by passing through the irradiation step in this range. From the viewpoint of improving the smoothness of the hard coat layer and further improving the visibility of the optical film in the wide angle direction, there is a need to optimize the type of solvent, the component ratio, and the solid content concentration and add the leveling agent and the like.

<Flexible Image Display Device>

The present invention includes a flexible display device including the optical film. The optical film of the present invention is preferably used as the front plate in the flexible image display device, and the front plate is referred to as a window film. The flexible image display device includes a laminate for a flexible image display device and an organic EL display panel, and the laminate for a flexible image display device is disposed on a viewing side of an organic EL display panel and is configured to be foldable. The laminate for the flexible image display device may further include a polarizing plate and a touch sensor, and a laminating order thereof is optional, but from the viewing side, a window film, a polarizing plate, a touch sensor or a window film, a touch sensor, and a polarizing plate are laminated in this order. If the polarizing plate is present on the viewing side of the touch sensor, a pattern of the touch sensor is less likely to be recognized visually, and the visibility of the displayed image is improved, which is preferable. Each member can be laminated using an adhesive, a pressure-sensitive adhesive or the like. In addition, the light shielding pattern may be provided on at least one surface of any layer of the window film, the polarizing plate, and the touch sensor.

[Polarizing Plate]

As described above, the flexible display device of the present invention includes a polarizing plate and preferably a circular polarizing plate. The circular polarizing plate is a functional layer having a function of transmitting only the right or left circularly polarized light component by laminating a λ/4 retardation plate on a linear polarizing plate. For example, the circular polarizing plate converts external light into right circularly polarized light and reflects the external light from the organic EL panel to shield left circularly polarized external light, and transmits only a luminescence component of the organic EL to suppress the influence of the reflected light, thereby making an image easy to see. In order to achieve the circular polarization function, an absorption axis of the linear polarizing plate and a slow axis of the λ/4 retardation plate theoretically need to be 45°, but practically 45±10°. The linear polarizing plate and the λ/4 retardation plate do not necessarily have to be laminated adjacent to each other as long as the relationship between the absorption axis and the slow axis satisfies the above-mentioned range. It is preferable to achieve complete circular polarization in the entire wavelength, but the circular polarizing plate in the present invention also includes an elliptically polarizing plate because it is not always necessary in practice. It is also preferable to improve the visibility in a state where polarized sunglasses are worn by further laminating the λ/4 retardation film on the viewing side of the linear polarizing plate and converting the emitted light into the circularly polarized light.

The linear polarizing plate is a functional layer which transmits light vibrating in a transmission axis direction but shields polarized light having a vibrational component vertical thereto. The linear polarizing plate may be configured to include a linear polarizer alone or a protective film attached to the linear polarizer and at least one surface thereof. The thickness of the linear polarizing plate may be 200 μm or less, and preferably 0.5 to 100 μm. If the thickness of the linear polarizing plate is in the above range, the flexibility of the linear polarizing plate is less likely to be reduced.

The linear polarizer may be a film type polarizer produced by dyeing and stretching a polyvinyl alcohol (hereinafter, sometimes abbreviated as PVA)-based film. A dichroic pigment such as iodine is adsorbed into a PVA-based film aligned by stretching, or stretched with being adsorbed to PVA, such that the dichroic pigment is aligned and exhibits polarization performance. The production of the film type polarizer may include other steps such as swelling, crosslinking with boric acid, washing with an aqueous solution, and drying. The stretching or dyeing steps may be performed with the PVA-based film alone, or may be performed in a state where the PVA-based film is laminated with another film such as polyethylene terephthalate. The thickness of the PVA-based film to be used is preferably 10 to 100 μm, and the stretching ratio is preferably 2 to 10 times.

Furthermore, another example of the polarizer includes a liquid crystal application type polarizer which is formed by applying a liquid crystal polarizing composition. The liquid crystalline polarizing composition can include a liquid crystalline compound and a dichroic pigment compound. The liquid crystalline compound only needs to have the property of exhibiting a liquid crystal state, and is preferable because it can exhibit high polarization performance particularly when it has a high-order alignment state such as a smectic phase. In addition, the liquid crystalline compound preferably has a polymerizable functional group.

The dichroic pigment compound is a pigment which exhibits dichroism by being aligned with the liquid crystal compound, and may have a polymerizable functional group, and the dichroic pigment itself may have liquid crystallinity. Any of the compounds contained in the liquid crystal polarizing composition has the polymerizable functional group. The liquid crystal polarizing composition can further contain an initiator, a solvent, a dispersant, a leveling agent, a stabilizer, a surfactant, a crosslinking agent, a silane coupling agent and the like.

A liquid crystal polarizing layer is produced by applying the liquid crystal polarizing composition on an alignment film to form the liquid crystal polarizing layer. The liquid crystal polarizing layer can be formed thinner than a film type polarizer, and the thickness thereof is preferably 0.5 to 10 μm and more preferably 1 to 5 μm.

The alignment film is produced, for example, by applying an alignment film forming composition on a substrate and imparting alignment by rubbing, irradiation with polarized light and the like. The alignment film forming composition may contain an aligning agent, and may further contain a solvent, a crosslinking agent, an initiator, a dispersant, a leveling agent, a silane coupling agent and the like. Examples of the aligning agent include polyvinyl alcohols, polyacrylates, polyamic acids, and polyimides. In the case of using the aligning agent which imparts alignment by the polarized light irradiation, it is preferable to use an aligning agent containing a cinnamate group. The weight average molecular weight of the polymer used as the aligning agent is, for example, about 10,000 to 1,000,000. The thickness of the alignment film is preferably 5 to 10,000 nm, and more preferably 10 to 500 nm in that an alignment control force is sufficiently exhibited.

The liquid crystal polarizing layer can be peeled off from the substrate, transferred and laminated, or the substrate can be laminated as it is. It is also preferable that the substrate plays a role as a protective film, a retardation plate, and a transparent substrate of a window film.

As the protective film, a transparent polymer film may be used, and the same materials and additives as those used for the transparent substrate of the window film can be used. In addition, the protective film may be a coating type protective film obtained by applying and curing a cationic curing composition such as an epoxy resin or a radical curing composition such as acrylate. If necessary, the protective film may include a plasticizer, an ultraviolet absorbent, an infrared absorber, a colorant such as a pigment or a dye, a fluorescent brightener, a dispersant, a heat stabilizer, a light stabilizer, an antistatic agent, an antioxidant, a lubricant, a solvent and the like. The thickness of the protective film is preferably 200 μm or less and more preferably 1 to 100 μm. If the thickness of the protective film is in the above range, the flexibility of the film is less likely to be reduced.

The $\lambda/4$ retardation plate is a film which gives a retardation of $\lambda/4$ in a direction (in-plane direction of the film) orthogonal to a traveling direction of incident light. The $\lambda/4$ retardation plate may be a stretching type retardation plate produced by stretching a polymer film such as a cellulose-based film, an olefin-based film, or a polycarbonate-based film. If necessary, the $\lambda/4$ retardation plate may include a phase difference conditioner, a plasticizer, an ultraviolet absorbent, an infrared absorber, a colorant such as a pigment or a dye, a fluorescent brightener, a dispersant, a heat stabilizer, a light stabilizer, an antistatic agent, an antioxidant, a lubricant, a solvent and the like.

The thickness of the stretching type retardation plate is preferably 200 μm or less and more preferably 1 to 100 μm. If the thickness of the stretching type retardation plate is in the above range, the flexibility of the stretching type retardation plate is less likely to be reduced.

In addition, another example of the $\lambda/4$ retardation plate includes a liquid crystal application type retardation plate which is formed by coating a liquid crystal composition.

The liquid crystal composition contains a liquid crystal compound exhibiting a liquid crystal state such as nematic, cholesteric, and smectic. The liquid crystal compound has a polymerizable functional group.

The liquid crystal composition can further contain an initiator, a solvent, a dispersant, a leveling agent, a stabilizer, a surfactant, a crosslinking agent, a silane coupling agent and the like.

Similar to the liquid crystal polarizing layer, the liquid crystal application type retardation plate can be produced by applying and curing a liquid crystal composition on a base to form a liquid crystal retardation layer. The liquid crystal application type retardation plate can be formed thinner than the stretching type retardation plate. The thickness of the liquid crystal polarizing layer is preferably 0.5 to 10 μm and more preferably 1 to 5 μm.

The liquid crystal application type retardation plate can be peeled off from the substrate, transferred and laminated, or the substrate can be laminated as it is. It is also preferable that the substrate plays a role as a protective film, a retardation plate, and a transparent substrate of a window film.

In general, there are many materials that exhibit greater birefringence at shorter wavelengths and smaller birefringence at longer wavelengths. In this case, since it is not possible to achieve a phase difference of $\lambda/4$ in the entire visible light region, the in-plane phase difference is designed to be preferably 100 to 180 nm and more preferably 130 to 150 nm so that it is $\lambda/4$ in the vicinity of 560 nm at which visibility is high. An inverse dispersion $\lambda/4$ retardation plate using a material having birefringence wavelength dispersion characteristics opposite to normal characteristics is preferable in that the visibility is good. As such a material, for example, the stretching type retardation plate can use those described in JP-A-2007-232873 and the like and liquid crystal application type retardation plate can use those described in JP-A-2010-30979 and the like.

In addition, as another method, there is also known a technology of obtaining a wide band $\lambda/4$ retardation plate by combining with a $\lambda/2$ retardation plate (for example, JP-A-10-90521 and the like). The $\lambda/2$ retardation plate is also produced by the same material and method as the $\lambda/4$ retardation plate. Although the combination of the stretching type retardation plate and the liquid crystal application type retardation plate is optional, both the stretched retardation plate and the liquid crystal application type retardation plate can use the liquid crystal application type retardation plate to have a thin thickness.

There is known a method of laminating a positive C plate on a circular polarizing plate in order to enhance visibility in an oblique direction (for example, JP-A-2014-224837). The positive C plate may be a liquid crystal application type retardation plate or a stretching type retardation plate. The retardation in the thickness direction of the retardation plate is preferably −200 to −20 nm and more preferably −140 to −40 nm.

[Touch Sensor]

As described above, the flexible display device of the present invention includes a touch sensor. The touch sensor is used as an input unit. Examples of the touch sensor includes various types such as a resistive film type, a surface acoustic wave type, an infrared type, an electromagnetic induction type, and a capacitance type, and preferably, the touch sensor uses the capacitance type.

The capacitance type touch sensor is divided into an active area and a non-active area located at an outer portion of the active area. The active area which is an area corresponding to an area (display portion) in which a screen is displayed on a display panel is an area in which a user's touch is sensed, and the non-active area is an area corresponding to an area (non-display portion) in which the screen is not displayed on the display device. The touch sensor can include a substrate having flexible characteristics, a sensing pattern formed on an active area of the substrate, and each sensing line which is formed in a non-active area of the substrate and connected to external driving circuits via the sensing pattern and a pad portion. As a substrate having a flexible property, the same material as the transparent substrate of the window film can be used.

The sensing pattern may include a first pattern formed in a first direction and a second pattern formed in a second direction. The first pattern and the second pattern are arranged in different directions from each other. The first pattern and the second pattern are formed on the same layer, and in order to sense the touched point, the respective patterns need to be electrically connected to each other. The first pattern has a form in which a plurality of unit patterns are connected to each other through a joint, but the second pattern has a structure in which a plurality of unit patterns are separated from each other in an island form, and therefore a separate bridge electrode is required to make the electrical connection of the second pattern. A well-known transparent electrode can be applied to the electrode for connection of the second pattern. Examples of materials for the transparent electrode include indium tin oxide (ITO), indium zinc oxide (IZO), zinc oxide (ZnO), indium zinc tin oxide (IZTO), indium gallium zinc oxide (IGZO), cadmium tin oxide (CTO), poly(3,4-ethylenedioxythiophene) (PEDOT), carbon nanotubes (CNT), graphene, metal wires and the like, and preferably, the ITO is used. These can be used alone or in combination of two or more. The metal used for the metal wire is not particularly limited, and examples thereof include silver, gold, aluminum, copper, iron, nickel, titanium, selenium, chromium, and the like, and these metals may be used alone or in combination of two or more.

The bridge electrode may be formed on the insulating layer via an insulating layer on the sensing pattern, and the bridge electrode may be formed on the substrate, and the insulating layer and the sensing pattern may be formed thereon. The bridge electrode may be formed of the same material as the sensing pattern, and may be formed of molybdenum, silver, aluminum, copper, palladium, gold, platinum, zinc, tin, titanium or an alloy of two or more thereof.

Since the first pattern and the second pattern need to be electrically isolated, an insulating layer is formed between the sensing pattern and the bridge electrode. The insulating layer can be formed only between the joint of the first pattern and the bridge electrode, or can be formed as a layer covering the entire sensing pattern. In the case of a layer covering the entire sensing pattern, the bridge electrode can connect the second pattern via a contact hole formed on the insulating layer.

The touch sensor can include an optical control layer, which is disposed between the substrate and the electrode, as means for appropriately compensating for a difference in transmittance between the pattern area in which the sensing pattern is formed and the non-pattern area in which the sensing pattern is not formed, and specifically, a difference in light transmittance occurring due to the difference in refractive index in these areas. The optical control layer can include an inorganic insulating material or an organic insulating material. The optical control layer can be formed by coating a photocurable organic pattern and a photocurable composition containing a solvent on the substrate. The photocurable composition can further include inorganic particles. The refractive index of the optical control layer can be increased by the inorganic particles.

A photocurable organic binder can contain a copolymer of each monomer such as an acrylate-based monomer, a styrene-based monomer, and a carboxylic acid-based monomer, in the range which the effect of the present invention is not impaired. The photocurable organic binder may be, for example, a copolymer including mutually different repeating units such as an epoxy group-containing repeating unit, an acrylate repeating unit, and a carboxylic acid repeating unit.

Examples of the inorganic particles include zirconia particles, titania particles, and alumina particles and the like.

The photocurable composition may further include various additives such as a photopolymerization initiator, a polymerizable monomer, and a curing assistant.

[Adhesive Layer]

Each layer (window film, circular polarizing plate, and touch sensor) forming the laminate for the flexible image display device and the film members (linear polarizing plate, λ/4 retardation plate and the like) constituting each layer can be bonded by an adhesive. Examples of the adhesive include commonly used adhesives and the like such as an aqueous adhesive, an aqueous solvent volatilization type adhesive, an organic solvent type, a solvent-free adhesive, a solid adhesive, a solvent volatilization type adhesive, a moisture-curing type adhesive, a heat-curing type adhesive, an anaerobic curing type, an active energy ray curing type adhesive, a curing agent mixed type adhesive, a heat melting type adhesive, a pressure sensitive type adhesive (pressure sensitive adhesive), and a remoistening type adhesive, and preferably, the aqueous solvent volatilization type adhesive, the active energy ray curing type, and the adhesive can be used. A thickness of the adhesive layer can be appropriately controlled according to the required adhesive force and the like, and is preferably 0.01 to 500 µm and more preferably 0.1 to 300 µm. Although a plurality of adhesive layers exist in the laminate for the flexible image display device, the thickness and the type of each adhesive layer may be the same or different.

As the aqueous solvent volatilization type adhesive, polymers dispersed in water such as a polyvinyl alcohol-based polymer, water-soluble polymers such as starch, an ethylene-vinyl acetate-based emulsion, a styrene-butadiene-based emulsion can be used as a main polymer. In addition to the main polymer and water, a crosslinking agent, a silane-based compound, an ionic compound, a crosslinking catalyst, an antioxidant, a dye, a pigment, an inorganic filler, an organic solvent and the like may be blended. In the case of the bonding by the aqueous solvent volatilization type adhesive, the aqueous solvent volatilization type adhesive is injected between the adherend layers to stick the adherend layers and dried to be able to impart an adhesive property. In the case of using the aqueous solvent volatilization type adhesive, the thickness of the adhesive layer is preferably 0.01 to 10 µm and more preferably 0.1 to 1 µm. When the aqueous solvent volatilization type adhesive is used in a plurality of layers, the thickness and the type of each layer may be the same or different.

The active energy ray curing type adhesive can be formed by curing an active energy ray curing composition containing a reactive material which forms an adhesive layer by irradiating the active energy ray. The active energy ray curing composition can contain at least one polymer of a radically polymerizable compound and a cationically polymerizable compound similar to those contained in the hard coat composition. As the radically polymerizable compound, the same compound as the radically polymerizable compound in the hard coat composition can be used.

As the cationically polymerizable compound, the same compound as the cationically polymerizable compound in the hard coat composition can be used.

As the cationically polymerizable compound used for the active energy ray curing composition, an epoxy compound is particularly preferable. It is also preferred to include a monofunctional compound as a reactive diluent in order to lower the viscosity as the adhesive composition.

The active energy ray composition can contain a monofunctional compound to lower the viscosity. Examples of the monofunctional compound include an acrylate-based monomer having one (meth)acryloyl group in one molecule thereof or a compound having one epoxy group or oxetanyl group in one molecule thereof, for example, glycidyl (meth) acrylate and the like.

The active energy ray composition can further contain a polymerization initiator. Examples of the polymerization initiator include a radical polymerization initiator, a cationic polymerization initiator, a radical and cationic polymerization initiator, which can be appropriately selected and used. These polymerization initiators are decomposed by at least one of the active energy ray irradiation and the heating to generate radicals or cations, thereby progressing the radical polymerization and the cationic polymerization. In the description of the hard coat composition, an initiator capable of initiating at least any one of the radical polymerization or the cationic polymerization by the active energy ray irradiation can be used.

The active energy ray curing composition can further include an ion scavenger, an antioxidant, a chain transfer agent, an adhesion imparting agent, a thermoplastic resin, a filler, a flow viscosity modifier, a plasticizer, an antifoam solvent, an additive, and a solvent. In the case of bonding two adherend layers by the active energy ray curing type adhesive, the active energy ray curing composition is applied to any one or both of the adherend layers and then stuck, and any one of the adhesive layer or both of the adherend layers are irradiated with the active energy ray to be cured and bonded. In the case of using the active energy ray curing type adhesive, the thickness of the adhesive layer is preferably 0.01 to 20 μm and more preferably 0.1 to 10 μm. When the active energy ray curing type adhesive is used in a plurality of adhesive layers, the thickness and the type of each layer may be the same or different.

As the pressure-sensitive adhesive, any classified into an acrylic-based pressure-sensitive adhesive, a urethane-based pressure-sensitive adhesive, a rubber-based pressure-sensitive adhesive, a silicone-based pressure-sensitive adhesive and the like can be used according to the main polymer. In addition to the main polymer to the pressure-sensitive adhesive, a crosslinking agent, a silane-based compound, an ionic compound, a crosslinking catalyst, an antioxidant, a tackifier, a plasticizer, a dye, a pigment, an inorganic filler and the like may be blended. Each component constituting the pressure-sensitive adhesive is dissolved and dispersed in a solvent to obtain a pressure-sensitive adhesive composition, and the pressure-sensitive adhesive composition is applied on the substrate and then dried to form a pressure-sensitive adhesive layer. The adhesive layer may be formed directly, or may be separately formed on a substrate and transferred. It is also preferred to use a release film to cover an adhesive surface prior to the bonding. In the case of using the active energy ray curing type adhesive, the thickness of the adhesive layer is preferably 0.1 to 500 μm and more preferably 1 to 300 μm. When the pressure-sensitive adhesive is used in a plurality of layers, the thickness and the type of each layer may be the same or different.

[Light Shielding Pattern]

The light shielding pattern may be applied as at least a part of a bezel or a housing of the flexible image display device. A wiring disposed on a side edge part of the flexible image display device is hidden by the light shielding pattern and is hardly recognized visually, such that the visibility of the image is improved. The light shielding pattern may be in the form of a single layer or multiple layers. The color of the light shielding pattern is not particularly limited, and may be various colors such as black, white and metal color. The light shielding pattern can be formed of a pigment for realizing a color and a polymer such as an acrylic-based resin, an ester-based resin, an epoxy-based resin, polyurethane, and silicone. These may be used alone or in combination of two or more. The light shielding pattern can be formed by various methods such as printing, lithography, and inkjet. A thickness of the light shielding pattern is preferably 1 to 100 μm and more preferably 2 to 50 μm. In addition, it is also preferable to provide a shape such as inclination in a thickness direction of the light shielding pattern.

EXAMPLES

Hereinafter, the present invention will be described in more detail with reference to Examples. Unless otherwise stated, "%" and "parts" in Examples mean % by mass and parts by mass. First, the evaluation method will be described.

1. Production of Optical Film 1-1. Preparation of Resin

Production Example 1: Preparation of Polyimide Resin 1

A reaction container in which a silica gel tube, a stirrer, and a thermometer were attached to a separable flask, and an oil bath were prepared. 75.6 g of 4,4'-(hexafluoroisopropylidene)diphthalic anhydride (6FDA) and 54.5 g of 2,2'-bis(trifluoromethyl)-4,4'-diaminodiphenyl (TFMB) were added to a reaction container installed in an oil bath. While the contents in the reaction container were stirred at 400 rpm, 530 g of N,N-dimethylacetamide (DMAc) was further added to the reaction container, and was kept stirred until the contents in the reaction container became a uniform solution. Subsequently, the mixture was kept stirred for an additional 20 hours while adjusting a temperature in the container to be in a range of 20 to 30° C. using the oil bath and reacted to form a polyamic acid. After 30 minutes, a stirring speed was changed to 100 rpm. After stirring for 20 hours, the reaction system temperature was returned to room temperature (25° C.), and 650 g of DMAc was further added to the reaction container to adjust a polymer concentration to be 10% by mass based on the total mass of contents in the reaction container. Furthermore, 32.3 g of pyridine and 41.7 g of acetic anhydride were further added to the reaction container, and the contents in the reaction container were stirred at room temperature for 10 hours to be imidized. The polyimide varnish was taken out from the reaction container. The resulting polyimide varnish was dropped into methanol to perform reprecipitation. The precipitate was taken out by filtration, and the resulting precipitate was dried by heating to remove a solvent, so polyimide resin 1 was obtained as a solid content (powder). As a result of GPC measurement on the resulting polyimide resin 1, a weight average molecular weight thereof was 350,000. In addition, an imidization rate of the polyimide resin 1 was 98.8%.

Production Example 2: Preparation of Polyimide Resin 2

Polyimide resin 2 having a weight average molecular weight of 280,000 and an imidization rate of 98.3% was obtained in the same manner as in Production Example 1 except that the reaction time was changed from 20 hours to 16 hours.

Production Example 3: Preparation of Polyamideimide Resin 1

A reaction container in which a stirring blade is attached to a 1 L of separable flask and an oil bath were prepared. 45 g (140.52 mmol) of TFMB and 768.55 g of DMAc were added to the reaction container installed in the oil bath. The contents in the reaction container were stirred at room temperature under a nitrogen gas atmosphere and TFMB was dissolved in DMAc. Next, 18.92 g (42.58 mmol) of 6FDA was further added to the reaction container, and the contents in the reaction container were kept stirred at room temperature for 3 hours. Thereafter, 4.19 g (14.19 mmol) of 4,4'-oxybis(benzoyl chloride) (OBBC) and then 17.29 g (85.16 mmol) of terephthaloyl chloride (TPC) were further added to the reaction container and were kept stirred at room temperature for 1 hour. Next, 4.63 g (49.68 mmol) of 4-methylpyridine and 13.04 g (127.75 mmol) of acetic anhydride were further added to the reaction container, and the contents in the reaction container were stirred at room temperature for 30 minutes. Thereafter, the temperature in the container was raised to 70° C. using the oil bath. The temperature in the container was maintained at 70° C., and the contents in the reaction container were further stirred for 3 hours to obtain a reaction solution.

The resulting reaction solution was cooled to room temperature and added to a large amount of methanol in a thread form. The deposited precipitate was taken out and immersed in methanol for 6 hours. Thereafter, the precipitate was washed with methanol. Next, the precipitate was dried under reduced pressure at 100° C. to obtain polyamideimide resin 1. The weight average molecular weight of the polyamideimide resin 1 was 400,000, and the imidization rate was 98.1%.

Production Example 4: Preparation of Polyamideimide Resin 2

A reaction container in which a stirring blade is attached to a 1 L of separable flask and an oil bath were prepared. 45 g (140.52 mmol) of TFMB and 768.55 g of DMAc were added to the reaction container installed in the oil bath. The contents in the reaction container were stirred at room temperature under a nitrogen gas atmosphere and TFMB was dissolved in DMAc. Next, 19.01 g (42.79 mmol) of 6FDA was further added to the reaction container, and the contents in the reaction container were stirred at room temperature for 3 hours. Thereafter, 4.21 g (14.26 mmol) of OBBC and then 17.30 g (85.59 mmol) of TPC were further added to the reaction container, and the contents in the reaction container were stirred at room temperature for 1 hour. Next, 4.63 g (49.68 mmol) of 4-methylpyridine and 13.04 g (127.75 mmol) of acetic anhydride were further added to the reaction container, and the contents in the reaction container were stirred at room temperature for 30 minutes. Thereafter, the temperature in the container was raised to 70° C. using the oil bath. The temperature in the container was maintained at 70° C. and further stirred for 3 hours to obtain a reaction solution.

The resulting reaction solution was cooled to room temperature and added to a large amount of methanol in a thread form, and the deposited precipitate was taken out and immersed in methanol for 6 hours. Thereafter, the precipitate was washed with methanol. Next, the precipitate was dried under reduced pressure at 100° C. to obtain polyamideimide resin 2. The weight average molecular weight of the resulting polyamideimide resin 2 was 365,000, and the imidization rate was 98.3%.

1-2. Production of Composition for Forming Hard Coat Layer

Production Example 5: Production of Composition for Forming Hard Coat Layer

7% by mass of a decafunctional urethane acrylate oligomers ("UV 1000" manufactured by Shina T&C Co.), 38.5% by mass of a bifunctional monomer (M 200, MIRAMER), 1.2% by mass of photoinitiator ("Irgacure (registered trademark) 184" manufactured by BASF Co.), 0.3% by mass of leveling agent ("BYK-3530" manufactured by BYK Co.), and 53% by mass of methyl ethyl ketone (MEK) were mixed to produce composition 1 for forming a hard coat layer.

1-3. Preparation of Varnish

Preparation Example 6: Preparation of Varnishes (1) and (3)

The varnishes (1) and (3) were produced by dissolving a polyimide-based resin in a solvent with the composition shown in Table 1.

In Table 1, the content (unit wt %) of the column "solvent" indicates a ratio (unit: % by mass) of a mass of a specific solvent to a total mass of all solvents. The content (unit: wt %) of the column "polyimide-based resin" indicates a ratio (unit: % by mass) of a mass of a specific polyimide-based resin to a total mass of all polyimide-based resins. PI-1, PI-2, PAI-1, and PAI-2 in the column "polyimide-based resin" each indicate polyimide resin 1, polyimide resin 2, polyamideimide resin 1 and polyamideimide resin 2. The content of the column "additive" indicates a ratio of a mass of the additive to a total mass of varnish. The content (unit: wt %) of the column "solid content" indicates a ratio (unit: % by mass) of a total mass of components other than a solvent to a total mass of polyimide-based resin.

TABLE 1

| | Solvent | | Polyimide-based resin | | | | Additive | Solid content |
|---|---|---|---|---|---|---|---|---|
| | DMAc [wt %] | GBL [wt %] | PI-1 [wt %] | PI-2 [wt %] | PAI-1 [wt %] | PAI-2 [wt %] | UVA [wt %] | ratio [wt %] |
| Varnish (1) | 10 | 90 | 50 | 50 | — | — | — | 16.5 |
| Varnish (2) | — | 100 | — | — | 50 | 50 | 5.7 | 8.2 |
| Varnish (3) | 10 | 90 | 90 | 10 | — | — | — | 15.0 |

Production Example 8: Preparation of Varnish (2)

The varnish (2) was produced with the composition shown in Table 1. Specifically, a polymer was dissolved in a GBL solvent at room temperature, and 5.7% by mass of Sumisorb (registered trademark) 340 (UVA) manufactured by Sumika Chemtex Co., Ltd., relative to a mass of polymer was added as an ultraviolet absorbent and stirred until being uniform to obtain the varnish (2).

1-4. Production of Optical Film

Example 1: Production of Optical Film 1

A coating film was formed in a width of 700 mm by performing salivation molding on a varnish (1) on a polyethylene terephthalate (PET) film ("A4100" manufactured by Toyobo Co., Ltd., thickness of 188 µm, thickness distribution of ±2 µm). A linear velocity was 0.4 m/min. The coating film was dried by being sequentially heated at 70° C. for 8 minutes, 100° C. for 10 minutes, 90° C. for 8 minutes, and 80° C. for 8 minutes, and the coating film was peeled off from the PET film. A tenter type dryer (configuration of one to six chambers) using a clip as a gripping tool was used, a temperature in the dryer was set to 200° C., a clip holding width was adjusted to 25 mm, a film conveyance speed was adjusted to 1.0 m/min, a ratio of a film width (distance between clips) of an inlet of the dryer and a film width of an outlet of a drying furnace was adjusted to 1.0, a wind speed in each chamber of the tenter type dryer was adjusted to 13.5 m/s in one chamber, 13 m/s in two chambers, 11 m/s in three to six chambers, so an optical film 1 which has 1% by mass of solvent contained therein and has a thickness of 79 µm was obtained.

After the optical film 1 coming out of the dryer is released from the clip, the portion of the film in contact with the clip was slit, and then the PET protective film was stuck to the film and wound around a 6-inch core formed of ABS, thereby obtaining a roll film.

Example 2: Production of Optical Film 2

The composition 1 for forming a hard coat layer produced in Production Example 5 was applied so that the thickness (thickness of a first hard coat layer) after the composition 1 was cured on the surface in contact with the PET film of the substrate at the time of film formation of the optical film 1 obtained in Example 1 is 20 µm, and dried in an oven of 80° C. for 1 minute. Thereafter, the coating film was cured by irradiating light in a light amount of 350 mJ/cm$^2$ using a high pressure mercury lamp to form the first hard coat layer. Composition 2 for forming a hard coat layer prepared in Production Example 6 was applied so that a thickness (thickness of a second hard coat layer) after the composition 2 was cured was cured is 15 µm, and dried in an oven of 80° C. for 2 minutes. Thereafter, the coating film was cured by irradiating light in a light amount of 350 mJ/cm$^2$ using a high pressure mercury lamp to form the first hard coat layer, thereby producing the optical film 2 including the hard coat layer.

Example 3: Production of Optical Film 3

An optical film 3 which has 0.7% by mass of solvent contained therein and has a thickness of 49 µm was produced in the same manner as the production method of the optical film 1 except that the varnish (1) was changed to the varnish (2), the linear velocity was changed from 0.4 m/min to 0.3 m/min, and the heating conditions of the coating film were sequentially changed from 70° C. for 8 minutes, 100° C. for 10 minutes, 90° C. for 8 minutes, and 80° C. for 8 minutes to 80° C. for 10 minutes, 100° C. for 10 minutes, 90° C. for 10 minutes, and 80° C. for 10 minutes.

Example 4: Production of Optical Film 4

An optical film 4 which has 1.0% by mass of solvent contained therein and has a thickness of 79 µm was produced in the same manner as the production method of the optical film 1 except that the varnish (1) was changed to the varnish (3) and the linear velocity was changed from 0.4 m/min to 0.2 m/min.

Comparative Example 1: Preparation of Optical Film 5

A polyimide film ("UPILEX" manufactured by Ube Industries, Ltd., 50 µm in thickness) was prepared as the optical film 5.

The formulation of the composition and the composition of the optical film are summarized in Table 2. Note that in Table 2, the column "presence or absence of HC" indicates whether the optical film has a hard coat layer (presence) or not (absence).

TABLE 2

| | Varnish | Polyimide-based resin | Thickness [µm] | Presence or absence of HC |
|---|---|---|---|---|
| Example 1 | Varnish (1) | PI-1 + PI-2 | 79 | Absence |
| Example 2 | Varnish (1) | PI-1 + PI-2 | 114 | Presence |
| Example 3 | Varnish (2) | PAI-1 + PAI-2 | 49 | Absence |
| Example 4 | Varnish (3) | PI-1 + PI-2 | 79 | Absence |
| Comparative Example 1 | — | PI | 50 | Absence |

2. Measurement Method

When the optical films obtained in Examples and Comparative Examples have the protective film, the following measurement and evaluation were performed using the optical film in the state where the protective film was peeled off.

2-1. Measurement of Reflection Image Clarity Value of Optical Film

The reflection image clarity value of the optical film was measured as follows by the reflection method in accordance with JIS K 7374 using an image clarity measuring device ("ICM-1" manufactured by Suga Test Instruments Co., Ltd.).

The optical film was provided in the image clarity measuring device. The optical film whose both surfaces are lightly wiped with ethanol prior to installation was dried and installed in a state in which foreign matters are removed from the surface thereof. Next, the light amount and the cross-sectional area were adjusted, and the white light adjusted to parallel light was irradiated to the installed optical film from an angle (incident angle) inclined 60° in the MD direction with respect to the plane of the optical film. Here, the irradiation surfaces of the optical films of Examples 1, 3 and 4 are surfaces in contact with the substrate at the time of production of the optical film. The irradiation surfaces of the optical films of Examples 2 and 5 are the surface which covered the hard coat layer on the surface in contact with the substrate at the time of the production of the optical film. The regular reflection light from the optical film was transmitted to the optical comb extending vertically to the optical axis of the regular reflection light by adjusting the cross-sectional area, and the light transmitted through the optical comb was received by the light receiver.

The optical comb (slit width: 0.125 mm) was moved by a predetermined unit width in a direction which is parallel to the plane of the optical comb and in which slits in the optical comb are arranged to repeatedly receive the transmitted light of the optical comb. As a result, the received light waveform was obtained. The maximum value M and the minimum value m of the relative light amount were obtained from the received light waveform obtained. The first reflection image clarity value $C_{MD}$ was calculated based on Formula (5) from the M and m obtained.

Each of the second reflection image clarity values was calculated in the same manner as the first reflection image clarity values, except that the incident angle of the irradiation light was changed to an angle inclined 60° in the TD direction from the vertical direction to the plane of the optical film.

2-2. Total Light Transmittance and Haze of Optical Film

The total light transmittance of the optical film is based on JIS K 7361-1:1997, and the haze is based on JIS K 7136:2000, and the total light transmittance and the haze were measured using a fully automatic direct reading haze computer HGM-2DP manufactured by Suga Test Instruments Co., Ltd. The measurement samples were produced by cutting the optical films of Examples and Comparative example into a size of 30 mm×30 mm.

2-3. Yellow Index of Optical Film

The yellow index (YI value) of the optical film was measured by an ultraviolet-visible near infrared spectrophotometer V-670 manufactured by JASCO Corporation. After the background measurement was performed in the state where the sample is absent, the optical film was set on the sample holder and the transmittance of light of 300 to 800 nm was measured to determine three stimulus values (X, Y, Z). The YI value was calculated based on the following Equation. Note that when the protective film is laminated on the side opposite to the support of the optical film, the protective film was peeled off and the yellow index was measured.

YI value=100×(1.2769X−1.0592Z)/Y

2-4. Tensile Modulus of Optical Film

The tensile modulus of the optical film was measured by performing a tensile test at a test speed of 5 m/min and a load cell of 5 kN in accordance with JIS K 7127 using an electromechanical universal tester (manufactured by Instron Corporation).

2-5. Thickness of Optical Film

The thickness of the optical film at 10 points or more was measured using a micrometer ("ID-C112XBS" manufactured by Mitutoyo Corporation), and the average value was calculated.

(2-6. Molecular Weight (Weight Average Molecular Weight) of Polyimide-Based Resin)

The gel permeation chromatography (GPC) measurement was performed using a liquid chromatograph LC-10ATvp manufactured by Shimadzu Corporation.
(1) Pretreatment Method
The sample was dissolved in γ-butyrolactone (GBL) to make 20% by mass of solution, diluted 100 times with DMF eluent, and filtered through 0.45 μm of membrane filter to obtain a measurement solution.
(2) Measurement Condition
Column: TSKgel Super AWM-H×2+Super AW 2500×1 (6.0 mm ID×150 mm×3)
Eluent: DMF (with 10 mmol of lithium bromide added)
Flow rate: 0.6 mL/min
Detector: RI detector
Column temperature: 40° C.
Injection amount: 20 μL
Molecular weight standard: Standard polystyrene

2-7. Imidization Rate

The imidization rate was determined by $^1$H-NMR measurement as follows.
(1) Pretreatment Method
The optical film containing the polyimide-based resin was dissolved in deuterated dimethyl sulfoxide (DMSO-$d_6$), and 2% by mass of solution was used as a measurement sample.
(2) Measurement Condition
Measurement device: 400 MHz NMR device JNM-ECZ400S/L1 manufactured by JEOL
Standard substance: DMSO-$d_6$ (2.5 ppm)
Sample temperature: Room temperature
The number of times of integration: 256 times
Relaxation time: 5 seconds
(3) Imidization Rate Analysis Method
(Imidization Rate of Polyimide Resin)
In the $^1$H-NMR spectrum obtained from the measurement sample containing the polyimide resin, among the observed benzene protons, the integral value of benzene proton A derived from the structure which was not changed before and after imidization was defined as $Int_A$. Also, the integral value of the amide proton derived from the amic acid structure remaining in the observed polyimide resin was defined as $Int_B$. The imidization rate of the polyimide resin was determined based on the following Equation from these integral values.

Imidization rate(%)=100×(1−$Int_B$/$Int_A$)

(Imidization Rate of Polyamideimide Resin)
In the $^1$H-NMR spectrum obtained from the measurement sample containing the polyamideimide resin, among the observed benzene protons, the integral value of benzene proton C which is not affected by a structure derived from the structure which was not changed before and after imidization and a structure derived from the amic acid structure remaining in the polyamideimide resin was defined as $Int_C$. In addition, among the observed benzene protons, an integral value of benzene proton D which is affected by a structure derived from the structure which was not changed before and after imidization and the structure derived from the amic acid structure remaining in the polyamideimide resin was defined as $Int_D$. A β value was obtained from the determined $Int_C$ and $Int_D$ according to the following Equation.

β=$Int_D$/$Int_C$

Next, the β value of the above Equation for the plurality of polyamideimide resin and the imidization rate of the polyimide resin of the above Equation were obtained, and the following Correlation Equation was determined from these results.

Imidization rate(%)=k×13+100

In the above Correlation Equation, k is a constant. Substituting β into the Correlation Equation, the imidization rate (%) of the polyamideimide resin was obtained.

2-8. Bending Resistance Test

The optical film was subjected to a bending resistance test in accordance with JIS K 5600-5-1. The bending resistance test was performed using a small desk bending tester (manufactured by Yuasa System Co., Ltd.). For the optical film after the bending resistance test, the reflection image clarity value and the haze were respectively measured in the same manner as the measurement method described above. The difference (the difference $\Delta C_{MD}$ in the first reflection image clarity values, the difference $\Delta C_{TD}$ in the second reflection image clarity values) between the reflection image clarity values and the difference (ΔHaze) in the hazes each was calculated by taking the absolute values of the difference in the reflection image clarity values and the difference in the hazes before and after the bending test, respectively.

2-9. Folding Endurance Test (MIT)

In accordance with ASTM standard D 2176-16, the number of times of bending of the optical film in Examples and Comparative Examples was determined as follows. The optical film was cut into strip forms of 15 mm×100 mm using a dumbbell cutter to prepare a measurement sample. The measurement sample was set in a main body of an MIT folding endurance fatigue tester ("Type 0530" manufactured by Toyo Seiki Seisaku-sho, Ltd.). Specifically, one end of the measurement sample was fixed to a load clamp, the other end was fixed to a bending clamp, and tension was applied to the measurement sample. In this state, under the conditions of a test speed of 175 cpm, a bending angle of 135°, a load of 0.75 kgf, and a bending radius of the bending clamp of R=3 mm, reciprocating bending motion in the back and forth direction until the measurement sample was broken was performed. The number of times of bending was measured.

3. Evaluation Method 3-1. Visibility

The optical film was cut into a 10 cm square. The MD direction of the polarizing plate with an adhesive layer and the same size (square of 10 cm) and the MD direction of the cut optical film were aligned, and the polarizing plate with the adhesive layer was stuck to the cut optical film to produce a sample for evaluation. Two samples for evaluation were produced for each of the optical films of one Example and Comparative Example.

One of two samples for evaluation was fixed on a base so that a fluorescent lamp is positioned vertically to a plane of the sample for evaluation, and a longitudinal direction of the fluorescent lamp is horizontal to the MD direction of the sample for evaluation.

An observer visually observed the fluorescent lamp image on the surface of the sample for evaluation at an angle of 30° with respect to the vertical direction of the plane of the sample for evaluation.

Similarly, the other sample for evaluation was fixed on the base and the fluorescent lamp image was observed, except that the longitudinal direction of the fluorescent lamp was changed from horizontal to vertical.

From the observation results, the visibility was evaluated based on the following evaluation criteria.
(Evaluation Criteria for Visibility)
⊙: Distortion of the fluorescent lamp image is hardly visualized.
○: Some distortion of the fluorescent lamp image can be visually recognized.
Δ: Distortion of the fluorescent lamp image is visualized.
x: Distortion of the fluorescent lamp image is clearly visualized.

4. Evaluation Result

For the optical films of Examples 1 to 4 and Comparative Example 1, the total light transmittance, the haze, the reflection image clarity value, the yellow index, and the number of times of folding were measured to evaluate the visibility. The measurement and evaluation results are summarized in Tables 3 to 5. Note that the column "Tt (%)" in Table 3 indicates the total light transmittance (unit: %) of the optical film. The column "Haze (%)" in Table 3 indicates the haze (unit: %) of the optical film.

TABLE 3

| | Optical characteristic | | Reflection image clarity value | | | | Yellow index | Folding endurance test (MIT) The number of |
|---|---|---|---|---|---|---|---|---|
| | Tt [%] | Haze [%] | $C_{MD}$ [%] | $C_{TD}$ [%] | $(C_{MD} + C_{TD})/2$ [%] | Modulus [MPa] | YI value | folding (times) |
| Example 1 | 91.3 | 0.2 | 65.5 | 60.0 | 62.8 | 4,000 | 1.1 | 360,000 |
| Example 2 | 91.0 | 0.3 | 60.1 | 50.1 | 55.1 | 4,200 | 1.4 | 200,000 |
| Example 3 | 90.2 | 0.2 | 50.5 | 45.2 | 47.9 | 5,000 | 1.8 | 730,000 |
| Example 4 | 91.3 | 0.2 | 48.2 | 40.1 | 44.1 | 4,000 | 1.1 | 370,000 |
| Comparative Example 1 | 26.1 | 3.4 | 42.5 | 26.7 | 34.6 | 9,600 | 120.6 | >800,000 |

TABLE 4

| | Reflection image clarity value [%] | | | | Difference in reflection image clarity values [%] | | Haze ΔHaze [%] |
|---|---|---|---|---|---|---|---|
| | Before bending | | After bending | | | | |
| | $C_{MD}$ | $C_{TD}$ | $C_{MD}$ | $C_{TD}$ | $\Delta C_{MD}$ | $\Delta C_{TD}$ | |
| Example 1 | 65.5 | 60.0 | 60.7 | 48.4 | 4.8 | 11.6 | 0.2 |
| Example 2 | 60.1 | 50.1 | 54.1 | 45.9 | 6.0 | 4.2 | 0.3 |
| Example 3 | 50.5 | 45.2 | 39.2 | 39.1 | 11.3 | 6.1 | 0.3 |
| Example 4 | 48.2 | 40.1 | 35.1 | 27.1 | 13.1 | 13.0 | 0.3 |
| Comparative Example 1 | 42.5 | 26.7 | 27.2 | 11.3 | 15.3 | 15.4 | 0.5 |

TABLE 5

| | Visibility | |
|---|---|---|
| | Vertical direction | Horizontal direction |
| Example 1 | ⊙ | ○ |
| Example 2 | ○ | ○ |
| Example 3 | Δ | ○ |
| Example 4 | Δ | Δ |
| Comparative Example 1 | X | X |

All of the optical films of Examples 1 to 4 contained a polyimide-based resin, and had a total light transmittance of 85% or more and a haze of 0.5% or less. In addition, in the optical films 1 to 4, the first reflection image clarity value $C_{MD}$ and the second reflection image clarity value $C_{TD}$ were 45%≤$C_{MD}$≤100%, 30%≤$C_{TD}$≤100%, and the average value $(C_{MD}+C_{TD})/2$ thereof was 35% or more and 100% or less. That is, the optical films 1 to 4 satisfied the Formulae (1) to (3).

Furthermore, in the optical films of Examples 1 to 4, the evaluation results of the visibility were any of ⊙, ○, and Δ.

The optical film of Comparative Example 1 had a total light transmittance of less than 85% and a haze of more than 0.5%. Furthermore, the optical film of Comparative Example 1 did not satisfy any of the Formulae (1) to (3).

Furthermore, in the optical film of Comparative Example 1, the evaluation result of the visibility was x.

It was cleared that the optical films of Examples 1 to 4 are superior to the optical film of Comparative Example 1 in the visibility in the wide angle direction.

In addition, it was also confirmed that the optical films of Examples 1 to 4 have low yellow index and excellent folding resistance.

What is claimed is:

1. An optical film comprising at least one resin selected from the group consisting of a polyimide-based resin and a polyamide-based resin, said optical film having a total light transmittance of 85% to 100% and a haze of 0.2% to 0.5%, wherein
   when a direction parallel to a machine direction in a plane of the optical film during production of the optical film is defined as an MD direction and a direction vertical to the machine direction is defined as a TD direction,
   for at least any one surface of the optical film, a first reflection image clarity value $C_{MD}$ in a direction inclined 60° in the MD direction from a vertical direction to the plane of the optical film and a second reflection image clarity value $C_{TD}$ in a direction inclined 60° in the TD direction from the vertical direction, which reflection image clarity values are obtained in accordance with JIS K 7374 utilizing an optical comb having a slit width of 0.125 mm, satisfy the mathematical expressions identified below as (1), (2), and (3):

$$45\% \leq C_{MD} \leq 100\% \qquad (1),$$

$$30\% \leq C_{TD} \leq 100\% \qquad (2), \text{ and}$$

$$35\% \leq (C_{MD}+C_{TD})/2 \leq 100\% \qquad (3).$$

2. The optical film according to claim 1, wherein a ΔHaze, a difference in the hazes before and after a bending test in accordance with HS K 5600-5-1, is 0.2% to 0.3%.

3. The optical film according to claim 1, wherein each of a $\Delta C_{MD}$, a difference in the first reflection image clarity values before and after a bending test, and a $\Delta C_{TD}$, a difference in the second reflection image clarity values before and after the bending test in accordance with HS K 5600-5-1, is less than 15.

4. The optical film according to claim 1, wherein the optical film has a thickness of 10 to 150 μm.

5. The optical film according to claim 1, wherein said optical film contains by mass relative to the optical film 5% or less silica particles.

6. The optical film according to claim 1, wherein a tensile modulus of the optical film at 80° C. is 4,000 to 9,000 MPa.

7. The optical film according to claim 1, wherein the optical film has a hard coat layer on at least one surface thereof.

8. The optical film according to claim 7, wherein the hard coat layer has a thickness of 3 to 30 μm.

9. A flexible display device comprising the optical film according to claim 1.

10. The flexible display device according to claim 9, further comprising a touch sensor.

11. The flexible display device according to claim 9, further comprising a polarizing plate.

* * * * *